US012786929B2

(12) United States Patent
Foti et al.

(10) Patent No.: US 12,786,929 B2
(45) Date of Patent: Nov. 3, 2026

(54) NETWORK SLICE ADMISSION CONTROL FUNCTION (NSACF) TRIGGERED UE DEREGISTRATION

(71) Applicant: Telefonaktiebolaget LM Ericsson (publ), Stockholm (SE)

(72) Inventors: George Foti, Dollard des Ormeaux (CA); Peter Hedman, Helsingborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 274 days.

(21) Appl. No.: 18/700,544

(22) PCT Filed: Oct. 11, 2022

(86) PCT No.: PCT/IB2022/059761

§ 371 (c)(1),
(2) Date: Apr. 11, 2024

(87) PCT Pub. No.: WO2023/062548

PCT Pub. Date: Apr. 20, 2023

(65) Prior Publication Data

US 2025/0234320 A1 Jul. 17, 2025

Related U.S. Application Data

(60) Provisional application No. 63/299,553, filed on Jan. 14, 2022, provisional application No. 63/288,214, (Continued)

(51) Int. Cl.
*H04W 60/06* (2009.01)
*H04W 48/08* (2009.01)
*H04W 36/14* (2009.01)

(52) U.S. Cl.
CPC .......... *H04W 60/06* (2013.01); *H04W 48/08* (2013.01); *H04W 36/1443* (2023.05)

(58) Field of Classification Search
CPC .. H04W 60/06; H04W 48/08; H04W 36/1443
See application file for complete search history.

(56) References Cited

U.S. PATENT DOCUMENTS

2021/0368421 A1* 11/2021 Venkataraman ...... H04W 76/11

FOREIGN PATENT DOCUMENTS

EP 3846388 A1 * 7/2021 ............ H04L 41/40
WO 2023031853 A1 3/2023

OTHER PUBLICATIONS

Lenovo et al. ("Signalling restriction from AMF", 3GPP TSG-SA WG2 Meeting #145, May 17-18, 2021 (Year: 2021).*

(Continued)

*Primary Examiner* — Jamal Javaid
(74) *Attorney, Agent, or Firm* — Sonoda & Kobayashi Intellectual Property Law; Sarvajit S. Patil

(57) ABSTRACT

Systems and methods are disclosed for Network Slice Admission Control Function (NSACF) triggered User Equipment (UE) deregistration. In one embodiment, a method performed in a communications system comprises, at a NSACF, determining that one or more UEs need to be deregistered from a particular network slice and, responsive to determining that one or more UEs need to be deregistered from the particular network slice, sending a request to a network node to deregister one or more UEs from the particular network slice. The method further comprises, at the network node, receiving the request from the NSACF and deregistering one or more UEs from the particular network slice in response to receiving the request.

16 Claims, 11 Drawing Sheets

Related U.S. Application Data filed on Dec. 10, 2021, provisional application No. 63/273,428, filed on Oct. 29, 2021, provisional application No. 63/256,167, filed on Oct. 15, 2021.

(56) References Cited

OTHER PUBLICATIONS

Author Unknown, "Technical Specification Group Services and System Aspects; Study on enhancement of network slicing; Phase 2 (Release 17)," Technical Report 23.700-40, Version 0.4.0, Jun. 2020, 3GPP Organizational Partners, 143 pages.
Author Unknown, "Technical Specification Group Services and System Aspects; System architecture for the 5G System (5GS); Stage 2 (Release 17)," Technical Specification 23.501, Version 17.2.0, Sep. 2021, 3GPP Organizational Partners, 542 pages.
Author Unknown, "Technical Specification Group Services and System Aspects; Procedures for the 5G System (5GS); Stage 2 (Release 17)," Technical Specification 23.502, Version 17.2.1, Sep. 2021, 3GPP Organizational Partners, 712 pages.
Author Unknown, "Technical Specification Group Services and System Aspects; Policy and charging control framework for the 5G System (5GS); Stage 2 (Release 16)," Technical Specification 23.503, Version 16.4.0, Mar. 2020, 3GPP Organizational Partners, 115 pages.
Author Unknown, "Technical Specification Group Core Network and Terminals; Non-Access-Stratum (NAS) protocol for 5G System (5GS); Stage 3; (Release 16)," Technical Specification 24.501, Version 16.4.1, Mar. 2020, 3GPP Organizational Partners, 666 pages.
Ericsson, "R1-2009223: On PDCCH, PUCCH and PUSCH enhancements with multiple TRPs," 3GPP TSG-RAN WG1 Meeting #103, Oct. 26-Nov. 13, 2020, Electronic Meeting, 25 pages.
Ericsson, "S2-208332: Support for Session Continuity for EPC 5GC, IWK, and inter-AMF Mobility," Change Request, 3GPP TSG-WG SA2 Meeting #148E, Nov. 15-19, 2021, Electronic Meeting, 17 pages.
Ericsson, "S2-2108331: Support for Session Continuity for EPC 5GC IWK, and inter-AMF Mobility," Change Request, 3GPP TSG-WG SA2 Meeting #148E, Nov. 15-19, 2021, Electronic Meeting, 5 pages.
Ericsson, et al., "S2-2200092: Support for Session Continuity for EPC 5GC IWK, and inter-AMF Mobility," 3GPP TSG-SA2 Meeting #149E, Feb. 14-25, 2022, Electronic Meeting, 18 pages.
Lenovo, et al., "S2-2104347: Signalling restriction from AMF," 3GPP TSG-SA WG2 Meeting #145, May 17-28, 2021, Electronic Meeting, 6 pages.
Nec et al., "S2-2101611: TS23.502 KI#1 Network Slice Admission Control Function (NSACF) services and procedures," 3GPP TSG-SA WG2 Meeting #143E, Feb. 24-Mar. 9, 2021, Electronic Meeting, 7 pages.
Oppo, "R1-1906287: Enhancements on multi-TRP and multi-panel transmission," 3GPP TSG RAN WG1 Meeting #97, May 13-17, 2019, Reno, Nevada, 11 pages.
Oppo, "R1-1911843: Enhancements on multi-TRP and multi-panel transmission," 3GPP TSG RAN WG1 Meeting #99, Nov. 18-22, 2019, Reno, Nevada, 11 pages.
ZTE, et al., "S2-2106839: KI#1KI#2—Resolve EN for NSAC procedure," 3GPP TSG SA WG2 Meeting #146E, Aug. 16-27, 2021, Electronic Meeting, 7 pages.
International Search Report and Written Opinion for International Patent Application No. PCT/IB2022/059761, mailed Feb. 6, 2023, 17 pages.

* cited by examiner

NETWORK SLICE ADMISSION CONTROL FUNCTION (NSACF) TRIGGERED UE DEREGISTRATION

RELATED APPLICATIONS

This application is a 35 U.S.C. § 371 national phase filing of International Application No. PCT/IB2022/059761, filed Oct. 11, 2022, which claims the benefit of provisional patent application Ser. No. 63/256,167, filed Oct. 15, 2021; provisional patent application Ser. No. 63/273,428, filed Oct. 29, 2021; provisional patent application Ser. No. 63/288,214, filed Dec. 10, 2021; and provisional patent application Ser. No. 63/299,553, filed Jan. 14, 2022, the disclosures of which are hereby incorporated herein by reference in their entireties.

TECHNICAL FIELD

The present disclosure relates to interworking between Evolved Packet Core (EPC) and Fifth Generation Core (5GC) with Network Slice Admission Control (NSAC).

BACKGROUND

Third Generation Partnership Project (3GPP) Technical Specification (TS) 23.501 V17.2.0 and TS 23.502 V17.2.1 define, among other things, aspects related to Network Slice Admission Control (NSAC). In particular, for a network slice, the NSAC procedures track the number of User Equipments (UEs) on each network slice and deny access to further UEs once a maximum number of UEs has been reached for that network slice. However, the current specifications are incomplete in that they do not address how NSAC is to be handled when there is mobility between the Fifth Generation Core (5GC) and the Evolved Packet Core (EPC) for a network slice for which interworking between the 5GC, and the EPC is allowed or when there is inter-Access and Mobility Management Function (AMF) mobility.

SUMMARY

Systems and methods are disclosed for Network Slice Admission Control Function (NSACF) triggered User Equipment (UE) deregistration. In one embodiment, a method performed in a communications system comprises, at a NSACF, determining that one or more UEs need to be deregistered from a particular network slice and, responsive to determining that one or more UEs need to be deregistered from the particular network slice, sending a request to a network node to deregister one or more UEs from the particular network slice. The method further comprises, at the network node, receiving the request from the NSACF and deregistering one or more UEs from the particular network slice in response to receiving the request.

Embodiments of a method performed by a NSACF for a communications system comprises determining that one or more UEs need to be deregistered from a particular network slice and, responsive to determining that one or more UEs need to be deregistered from the particular network slice, sending a request to a network node to deregister one or more UEs from the particular network slice.

In one embodiment, determining that one or more UEs need to be deregistered from the particular network slice comprises determining that a particular UE needs to be deregistered from the particular network slice and the request sent to the network node is a request to deregister the particular UE from the particular network slice. In one embodiment, determining that the particular UE needs to be deregistered from the particular network slice comprises determining that the particular UE needs to be deregistered from the particular network slice due to a number of registered UEs for the particular network slice exceeding a defined maximum number of registered UEs for the particular network slice. In another embodiment, determining that the particular UE needs to be deregistered from the particular network slice comprises determining that the particular UE needs to be deregistered from the particular network slice due to a number of registered UEs for the particular network slice exceeding a defined maximum number of registered UEs for the particular network slice due to an increase in the number of registered UEs for the network slice due to service continuity. In another embodiment, determining that the particular UE needs to be deregistered from the particular network slice comprises determining that the particular UE needs to be deregistered from the particular network slice due to a number of registered UEs for the particular network slice exceeding a defined maximum number of registered UEs for the particular network slice due to a decrease in the defined maximum number of UEs for the network slice to a value that is less than the number of registered UEs for the network slice.

In one embodiment, determining that one or more UEs need to be deregistered from the particular network slice comprises determining that a number of UEs needs to be deregistered from the particular network slice, and the request sent to the network node is a request to deregister the determined number of UEs from the particular network slice. In one embodiment, the request comprises information that indicates: (a) the particular network slice and (b) the determined number of UEs to be deregistered from the particular network slice. In one embodiment, determining that the number of UEs needs to be deregistered from the particular network slice comprises determining that the number of UEs needs to be deregistered from the particular network slice due to a number of registered UEs for the particular network slice exceeding a defined maximum number of registered UEs for the particular network slice. In another embodiment, determining that the number of UEs needs to be deregistered from the particular network slice comprises determining that the number of UEs needs to be deregistered from the particular network slice due to a number of registered UEs for the particular network slice exceeding a defined maximum number of registered UEs for the particular network slice due to an increase in the number of registered UEs for the network slice due to service continuity. In another embodiment, determining that the number of UEs needs to be deregistered from the particular network slice comprises determining that the number of UEs needs to be deregistered from the particular network slice due to a number of registered UEs for the particular network slice exceeding a defined maximum number of registered UEs for the particular network slice due to a decrease in the defined maximum number of UEs for the network slice to a value that is less than the number of registered UEs for the network slice.

In one embodiment, determining that one or more UEs need to be deregistered from a particular network slice comprises receiving, from a network node, an update request that comprises information that comprises (a) information that indicates one or more network slices requested by a respective UE and (b) one or more network slices previously allowed or registered for the respective UE in a previous access of the respective UE, and performing a number of UEs per network slice availability check and update procedure based on the information comprised in the update request. In one embodiment, performing the number of UEs per network slice availability check and update procedure comprises determining that one or more UEs need to be deregistered from the particular network slice based on a result of performing the number of UEs per network slice availability check and update procedure. In one embodiment, performing the number of UEs per network slice availability check and update procedure based on the information comprised in the update request further comprises increasing a count for a number of UEs for the particular network slice, which is indicated by the information comprised in the update request as being both requested by the respective UE and previously allowed or registered for the respective UE in the previous access of the respective UE, determining that a maximum number of UEs has been reached for the particular network slice, and sending a response to the network node that enables granting the respective UE access to the particular network slice, even though the maximum number of UEs has been reached for the particular network slice. In one embodiment, the network node is an Access and Mobility Management Function (AMF), and receiving the update request is in association with an inter-AMF mobility of the respective UE from an old AMF to the AMF. In another embodiment, the network node is an AMF, and receiving the update request is in association with mobility of the respective UE from an Evolved Packet Core (EPC) to Fifth Generation Core (5GC) where interworking between EPC and 5GC is required for the particular network slice. In another embodiment, the network node is an Session Management Function (SMF) plus Packet Data Network (PDN) Gateway Control Plane (PGW-C) (i.e., a SMF+PGW-C), and sending the update request to the NSACF is triggered in association with mobility of the respective UE from 5GC to EPC where interworking between EPC and 5GC is required for the particular network slice.

In one embodiment, the method further comprises receiving, from a network node, an update request that comprises information that indicates one or more network slices for which session continuity is required and performing a number of UEs per network slice availability check and update procedure based on the information comprised in the update request. In one embodiment, performing the number of UEs per network slice availability check and update procedure comprises determining that one or more UEs need to be deregistered from the particular network slice based on a result of performing the number of UEs per network slice availability check and update procedure. In one embodiment, performing the number of UEs per network slice availability check and update procedure based on the information comprised in the update request further comprises, for the particular network slice for which the information comprised in the update request indicates session continuity is required, increasing a count for a number of UEs for the particular network slice, determining that a maximum number of UEs has been reached for the particular network slice, and sending a response to the network node that enables granting a respective UE access to the particular network slice, even though the maximum number of UEs has been reached for the particular network slice. In one embodiment, the network node is an AMF, and the update request is received in association with an inter-AMF mobility of a respective UE from an old AMF to the AMF. In one embodiment, the update request comprises information that indicates one or more allowed network slices for the respective UE, and the one or more network slices for which session continuity is required comprise at least one of the one or more allowed network slices for the respective UE. In one embodiment, information that indicates the one or more network slices for which session continuity is required comprises an indication that session continuity is required only for network slices requested by the respective UE and network slices allowed for the respective UE by the old AMF and obtained by the new AMF from the old AMF, as well as being allowed in the new AMF. In another embodiment, the network node is an AMF, the update request is received in association with mobility of the respective UE from an EPC to 5GC for the particular network slice, and the particular network slice is one of the one or more network slices indicated by the information comprised in the update request as requiring session continuity. In another embodiment, the network node is an SMF+PGW-C, the update request is received in association with mobility of the respective UE from 5GC to EPC for the particular network slice, and the particular network slice is one of the one or more network slices indicated by the information comprised in the update request as requiring session continuity.

In one embodiment, performing the number of UEs per network slice availability check and update procedure based on the information comprised in the update request further comprises, for a particular network slice for which the information comprised in the update request indicates session continuity is required, increasing a count for a number of UEs for the particular network slice, determining that a maximum number of UEs has been exceeded for the particular network slice, and sending a response to the network node that enables granting a respective UE access to the particular network slice, even though the maximum number of UEs has been reached for the particular network slice.

Corresponding embodiments of a network node for implementing a NSACF for a communications system are also disclosed. In one embodiment, a network node for implementing a NSACF for a communications system is adapted to determine that one or more UEs need to be deregistered from a particular network slice and, responsive to determining that one or more UEs need to be deregistered from the particular network slice, send a request to a network node to deregister one or more UEs from the particular network slice.

In one embodiment, a network node for implementing a NSACF for a communications system comprises processing circuitry configured to cause the network node to determine that one or more UEs need to be deregistered from a particular network slice and, responsive to determining that one or more UEs need to be deregistered from the particular network slice, send a request to a network node to deregister one or more UEs from the particular network slice.

Embodiments of a method performed by a network node for a communications system are also disclosed. In one embodiment, a method performed by a network node for a communications system comprises receiving, from a NSACF, a request to deregister one or more UEs from a particular network slice and deregistering one or more UEs from the particular network slice in response to receiving the request.

In one embodiment, the request is a request to deregister a particular UE from the particular network slice, and deregistering one or more UEs from the particular network slice in response to receiving the request comprises deregistering (808) the particular UE from the particular network slice in response to receiving the request.

In one embodiment, the request is a request to deregister a number of UEs from the particular network slice, and deregistering one or more UEs from the particular network slice in response to receiving the request comprises deregistering the number of UEs from the particular network slice in response to receiving the request. In one embodiment, deregistering the number of UEs from the particular network slice in response to receiving the request comprises selecting one or more UEs to be deregistered from the particular network slice in accordance with the request, wherein the number of UEs selected corresponds to the number of UEs requested to be deregistered from the particular network slice and deregistering the selected one or more UEs from the particular network slice. In one embodiment, the selected one or more UEs comprise one or more UEs for which the particular network slice is an allowed network slice that do not have any Protocol Data Unit (PDU) session established for the particular network slice.

Corresponding embodiments of a network node are also disclosed. In one embodiment, a network node for a communications system is adapted to receive, from a NSACF, a request to deregister one or more UEs from a particular network slice and deregister one or more UEs from the particular network slice in response to receiving the request.

In one embodiment, a network node for a communications system comprises processing circuitry configured to cause the network node to receive, from a NSACF, a request to deregister one or more UEs from a particular network slice and deregister one or more UEs from the particular network slice in response to receiving the request.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
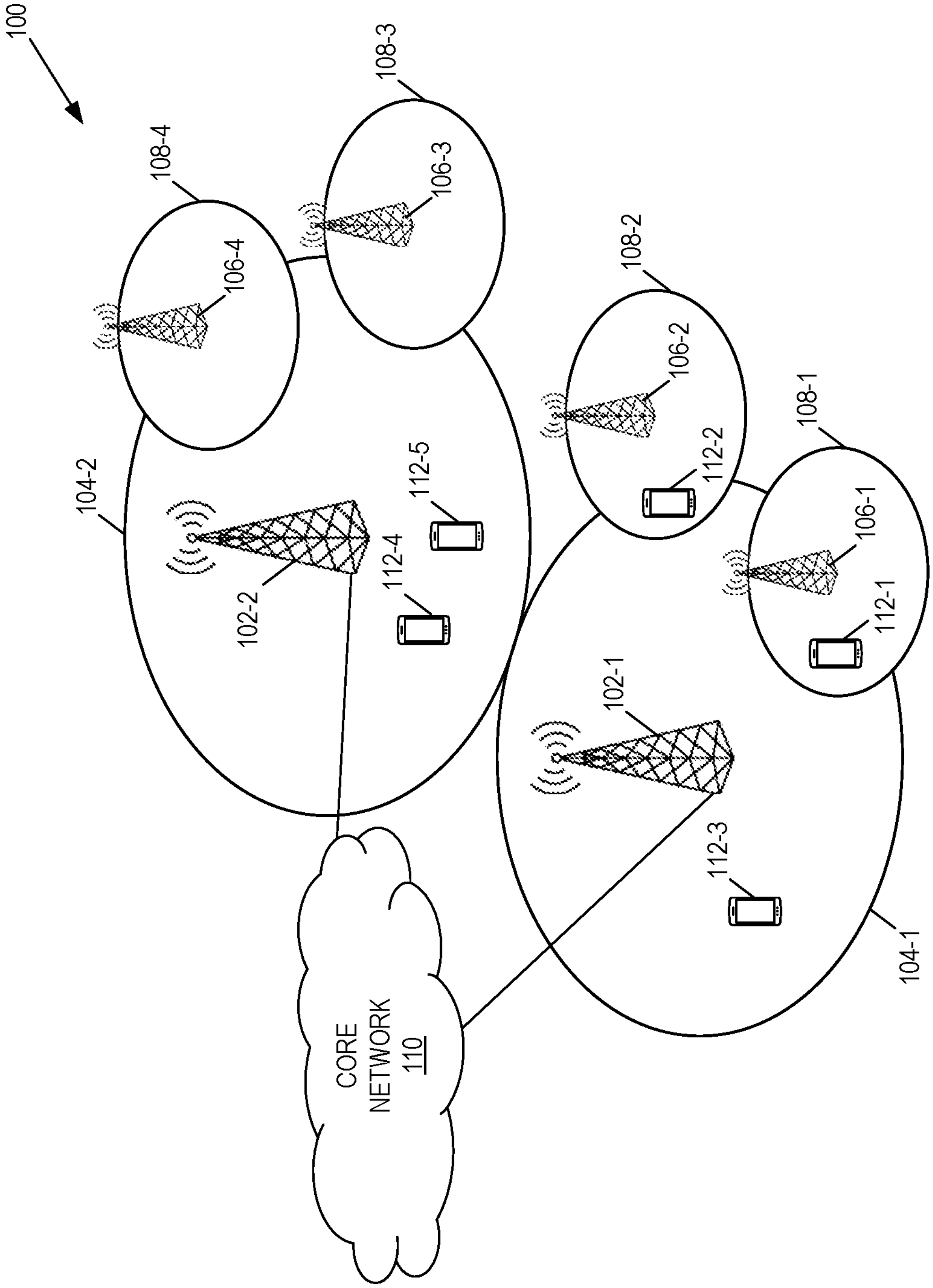
FIGS. 1, 2, 3, and 4 illustrate examples of a cellular communications system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There is a need to fulfill the following requirements when there is interworking (IWK) between Evolved Packet Core (EPC) and Fifth Generation Core (5GC) for network slice(s) that are subject to Network Slice Admission Control (NSAC):

- When a User Equipment (UE) moves to a Fifth Generation System (5GS) from EPC, a Network Slice Admission Control Function (NSACF) in 5GC overrules congestion (i.e., when the maximum number of registered UEs has been reached) only for network slices subject to interworking for registration purposes. Regular processing applies to newly requested network slices. This applies to UEs while roaming or at home.
- The NSACF in the Public Land Mobile Network (PLMN) in EPC overrules slice congestion for a UE (e.g., inbound roamer, or a UE at home) handing over from 5GC to EPC to ensure that the UE can successfully attach (register) in EPC when the maximum number of registered UEs has been reached.

Stated differently, in interworking between 5GC and EPC, when a UE initiates in EPC a home routed Packet Data Network (PDN) connection and uses a network slice subject to interworking and NSAC, the Session Management Function (SMF) plus PDN Gateway Control plane PGW-C), which is denoted herein as the "SMF+PGW-C", is allocated in the Home PLMN (HPLMN). When the UE moves to 5GS and registers in 5GS, given that the UE is already counted when it attached in EPC, the AMF in the 5GC needs to ensure that the UE registers successfully regardless of congestion (maximum quota reached for NSAC, when the maximum number of registered UEs has been reached only for network slices subject to interworking) during the interworking of the network slice in 5GS. Hence, there is a need to ensure that, even if the quota in 5GC has been reached for the slice subject to interworking, the AMF registers the roaming UE successfully in order to maintain session continuity for home routed PDN connections. The above applies while the UE is roaming or at home.

In addition to the above, there is a need to ensure session continuity when there is inter-mobility between AMFs in 5G for slices that are requested/allowed in the old AMF and supported, requested, and allowed in the new AMF and that are subject to NSAC when the new AMF is in a new service area served by a different NSACF than the old AMF. In this case, the NSACF used by the new AMF ignores congestion (i.e., when the maximum number of registered UEs has been reached for slices requested in the old AMF and now are being requested and allowed in the new AMF) for these slices ONLY. This will not apply to newly requested slices in the new AMF not requested or supported in the old AMF.

Stated differently, in addition to the above, in case of inter-AMF mobility in 5GC, there is a need to ensure session continuity when there is inter-mobility between AMFs in 5GC for network slices that are requested/allowed in the old AMF and supported, requested, and allowed in the new AMF and that are subject to NSAC when the new AMF is in a new service area served by a different NSACF (within different PLMNs or within the same PLMN) than the old AMF. In this case, the NSACF used by the new AMF ignores congestion (i.e., does not reject the request if maximum quota reached) for these network slices ONLY. This will not apply to newly requested network slices in the new AMF not requested or supported in the old AMF.

Solutions for the aforementioned challenges are disclosed herein.

In one embodiment, AMFs are configured with information that indicates whether EPC supports NSAC for network slices subject to interworking. This configuration information can be different for different Visited Public Land Mobile Networks (VPLMNs) with whom the HPLMN has roaming agreements. As such, in this case, during mobility (e.g., handover), the AMF, upon detecting that a UE has been in EPC, includes a list of slices for whom the NSACF ignores if the maximum number of UE has been reached. In one embodiment, this list of slices for whom the NSACF ignores if the maximum number of UE has been reached is a list of allowed network slices in the previous access.

In addition, in one embodiment, SMF+PGW-C in HPLMNs are configured with the needed information to apply the same principles as above in instructing the NSACF they interact with to ignore if the maximum number of UEs has been reached.

The same principle applies during inter-AMF mobility, when the new AMF includes the list of allowed S-NSSAI in the old AMF allowing the NSACF to ignore if the maximum number of UEs has been reached.

Embodiments are disclosed herein for maintaining session continuity when performing NSAC in a cellular communications system. In one embodiment, a method performed in a cellular communications system comprises, at a network node (e.g., AMF or SMF+PGW-C), sending, to a Network Slice Admission Control Function (NSACF), an update request that comprises: (a) information that indicates one or more network slices requested by a UE and (b) information that indicates one or more network slices previously allowed or registered for the respective UE in a previous access of the respective UE. The method further comprises, at the NSACF, receiving the update request and performing a number of UEs per network slice availability check and update procedure based on the information comprised in the update request. In one embodiment, this procedure comprises increasing a count for a number of UEs for a particular network slice that is indicated by the information comprised in the update request as being both requested by the respective UE and previously allowed or registered for the respective UE in the previous access of the respective UE, determining that a maximum number of UEs has been reached for the particular network slice, and sending a response to the network node that enables granting the respective UE access to the particular network slice, even though the maximum number of UEs has been reached for the particular network slice.

In another embodiment, a method performed in a cellular communications system comprises, at a network node (e.g., AMF or SMF+PGW-C), sending, to a NSACF, an update request that comprises information that indicates one or more network slices for which session continuity is required. The method further comprises, at the NSACF, receiving the update request and performing a number of UEs per network slice availability check and update procedure based on the information comprised in the update request. In one embodiment, this procedure comprises, for a particular network slice for which the information comprised in the update request indicates session continuity is required, increasing a count for a number of UEs for the particular network slice, determining that a maximum number of UEs has been reached for the particular network slice, and sending a response to the network node that enables granting the respective UE access to the particular network slice, even though the maximum number of UEs has been reached for the particular network slice (responsive to the indication that session continuity is required for the particular network slice).

In another embodiment, a method performed by a NSACF for a cellular communications system comprises determining that a particular UE needs to be deregistered from a particular network slice and sending a request to a network node to deregister the particular UE from the particular network slice. In one embodiment, determining that the particular UE needs to be deregistered from the particular network slice comprises determining that the particular UE needs to be deregistered from the particular network slice due to a number of registered UEs for the particular network slice exceeding a defined maximum number of registered UEs for the particular network slice (e.g., due to an increase in the number of registered UEs for the network slice due to service continuity or due to a decrease in the defined maximum number of UEs for the network slice to a value that is less than the number of registered UEs for the network slice).

In another embodiment, a method performed by a NSACF for a cellular communications system comprises determining that a number of UEs needs to be deregistered from a particular network slice and sending a request to a network node to deregister one or more UEs from the particular network slice, the request comprising information that indicates: (a) the particular network slice and (b) the determined number of UEs to be deregistered from the particular network slice. In one embodiment, determining that the particular UE needs to be deregistered from the particular network slice comprises determining that the particular UE needs to be deregistered from the particular network slice due to a number of registered UEs for the particular network slice exceeding a defined maximum number of registered UEs for the particular network slice (e.g., due to an increase in the number of registered UEs for the network slice due to service continuity or due to a decrease in the defined maximum number of UEs for the network slice to a value that is less than the number of registered UEs for the network slice).

FIG. 1 illustrates one example of a cellular communications system 100 in which embodiments of the present disclosure may be implemented. In the embodiments described herein, the cellular communications system 100 is a 5G system (5GS) or a system that enables interworking between a 5G system (5GS) and an Evolved Packet System (EPS). In this example, the system 100 includes base stations 102-1 and 102-2, which in the NG-RAN include NR base stations (gNBs) and optionally next generation eNBs (ng-eNBs) (e.g., LTE RAN nodes connected to the 5GC) and in the E-UTRAN include eNBs, controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The system 100 may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network(s) 110, which in the 5GS is the 5GC and in the EPS is the EPC. The base stations 102 (and optionally the low power nodes 106) are connected to the core network(s) 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs, but the present disclosure is not limited thereto.

Figure 2:
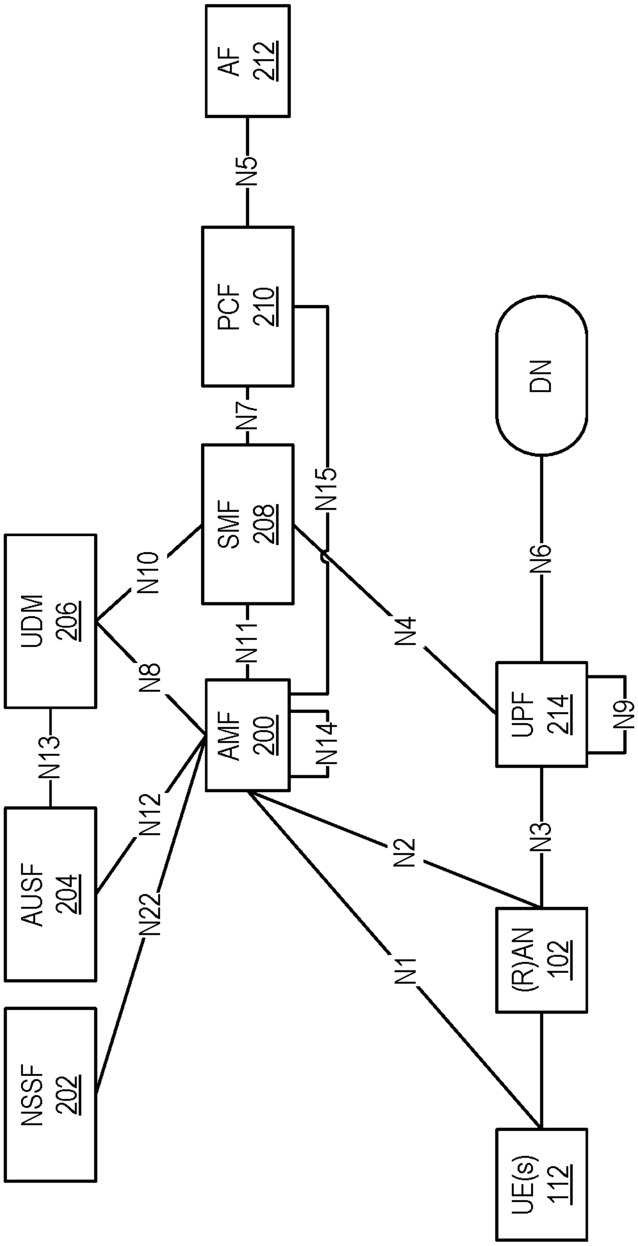

FIG. 2 illustrates a wireless communication system represented as a 5G network architecture composed of core Network Functions (NFs), where interaction between any two NFs is represented by a point-to-point reference point/interface. FIG. 2 can be viewed as one particular implementation of the system 100 of FIG. 1.

Seen from the access side the 5G network architecture shown in FIG. 2 comprises a plurality of UEs 112 connected to either a RAN 102 or an Access Network (AN) as well as an AMF 200. Typically, the R (AN) 102 comprises base stations, e.g. such as eNBs or gNBs or similar. Seen from the core network side, the 5GC NFs shown in FIG. 2 include a NSSF 202, an AUSF 204, a UDM 206, the AMF 200, a SMF 208, a PCF 210, and an Application Function (AF) 212.

Reference point representations of the 5G network architecture are used to develop detailed call flows in the normative standardization. The N1 reference point is defined to carry signaling between the UE 112 and AMF 200. The reference points for connecting between the AN 102 and AMF 200 and between the AN 102 and UPF 214 are defined as N2 and N3, respectively. There is a reference point, N11, between the AMF 200 and SMF 208, which implies that the SMF 208 is at least partly controlled by the AMF 200. N4 is used by the SMF 208 and UPF 214 so that the UPF 214 can be set using the control signal generated by the SMF 208, and the UPF 214 can report its state to the SMF 208. N9 is the reference point for the connection between different UPFs 214, and N14 is the reference point connecting between different AMFs 200, respectively. N15 and N7 are defined since the PCF 210 applies policy to the AMF 200 and SMF 208, respectively. N12 is required for the AMF 200 to perform authentication of the UE 112. N8 and N10 are defined because the subscription data of the UE 112 is required for the AMF 200 and SMF 208.

The 5GC network aims at separating UP and CP. The UP carries user traffic while the CP carries signaling in the network. In FIG. 2, the UPF 214 is in the UP and all other NFs, i.e., the AMF 200, SMF 208, PCF 210, AF 212, NSSF 202, AUSF 204, and UDM 206, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 200 and SMF 208 are independent functions in the CP. Separated AMF 200 and SMF 208 allow independent evolution and scaling. Other CP functions like the PCF 210 and AUSF 204 can be separated as shown in FIG. 2. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 3:
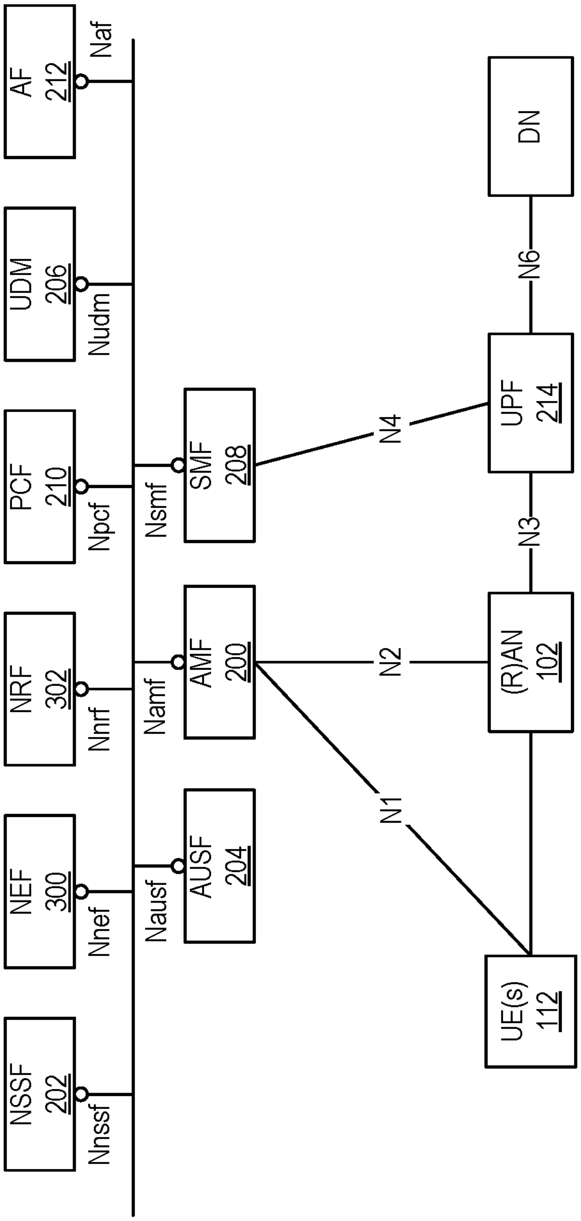

FIG. 3 illustrates a 5G network architecture using service-based interfaces between the NFs in the CP, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFS through the service-based interface. In FIG. 3 the service based interfaces are indicated by the letter "N" followed by the name of the NF, e.g. Namf for the service based interface of the AMF 200 and Nsmf for the service based interface of the SMF 208, etc. The NEF 300 and the NRF 302 in FIG. 3 are not shown in FIG. 2 discussed above. However, it should be clarified that all NFs depicted in FIG. 2 can interact with the NEF 300 and the NRF 302 of FIG. 3 as necessary, though not explicitly indicated in FIG. 2.

Some properties of the NFs shown in FIGS. 2 and 3 may be described in the following manner. The AMF 200 provides UE-based authentication, authorization, mobility management, etc. A UE 112 even using multiple access technologies is basically connected to a single AMF 200 because the AMF 200 is independent of the access technologies. The SMF 208 is responsible for session management and allocates Internet Protocol (IP) addresses to UEs. It also selects and controls the UPF 214 for data transfer. If a UE 112 has multiple sessions, different SMFs 208 may be allocated to each session to manage them individually and possibly provide different functionalities per session. The AF 212 provides information on the packet flow to the PCF 210 responsible for policy control in order to support QoS. Based on the information, the PCF 210 determines policies about mobility and session management to make the AMF 200 and SMF 208 operate properly. The AUSF 204 supports authentication function for UEs or similar and thus stores data for authentication of UEs or similar while the UDM 206 stores subscription data of the UE 112. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 4:
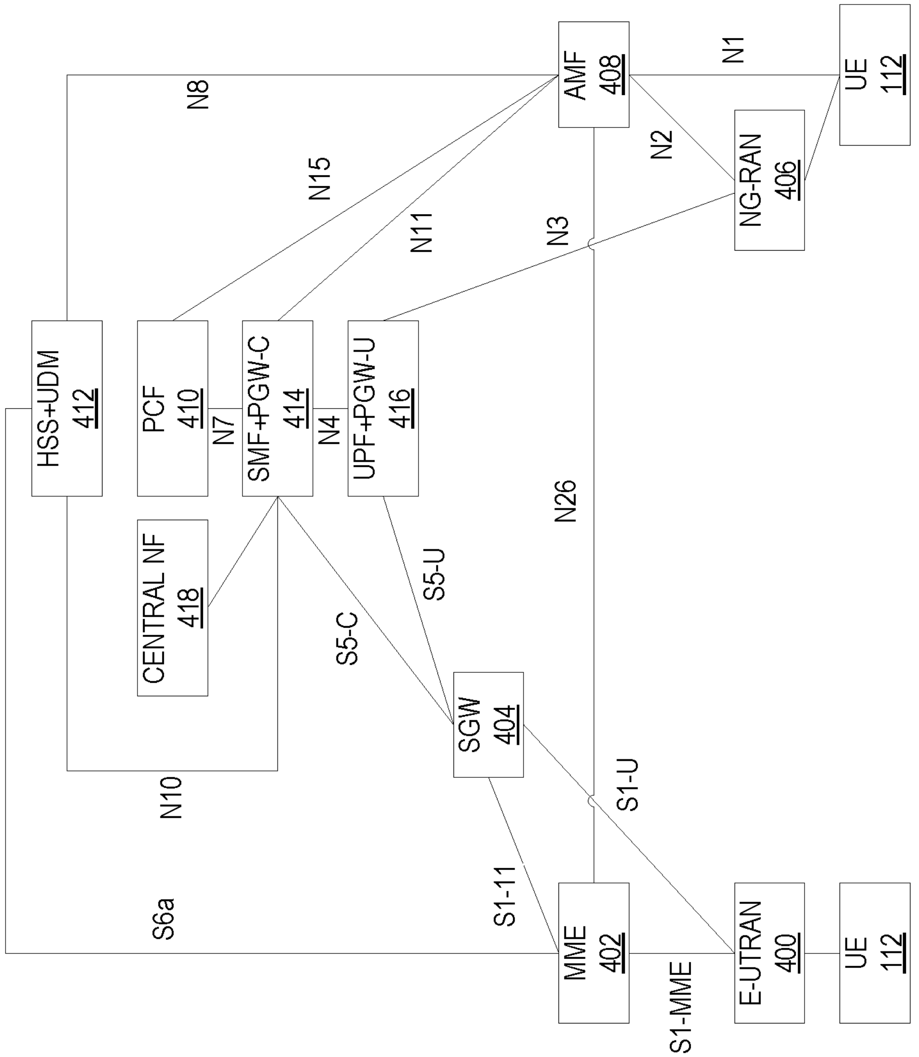

FIG. 4 illustrates one example of the cellular communications system 100 in which embodiments of the present disclosure may be implemented. In this example, the cellular communications system 100 includes both a 5GS and an EPS with interworking between the 5GS and EPS. As illustrated, in regard to the EPS, the cellular communications system 100 includes an E-UTRAN 400, which includes one or more base stations 102 that are, in this case, eNBs and a number of core network nodes of the EPC. As illustrated, the network nodes of the EPC include, in this example, an MME 402 and a SGW 404. In regard to the 5GS, the cellular communications system 100 includes a NG-RAN 406, which includes one or more base stations that are, in this case, gNBs or ng-eNBs and a number of NFs of the 5GC. As illustrated, the NFs include an AMF 408 and a PCF 410. In addition, to enable interworking between the 5GS and the EPS, the cellular communications system 100 includes a number of combined, or joint, NFs. The combined NFs include, in this example, a combined HSS and UDM 412 (also referred to herein as HSS+UDM 412 or HSS/UDM 412), a combined SMF and PGW-C 414 (also referred to herein as a SMF+PGW-C 414 or SMF/PGW-C 414), and a combined UPF and PGW-U 416 (also referred to herein as a UPF+PGW-U 416 or UPF/PGW-U 416). In some embodiments of the present disclosure, the SMF+PGW-C 414 interacts with a Central NF 418 to handle quotas for the number of PDU sessions or PDN connections for a network slice (S-NSSAI) and/or quotas for the number of registered UEs 112 for a network slice.

Importantly, the architecture of FIG. 4 is only an example. Specifically, it is an example for the non-roaming scenario. A similar architecture for the roaming scenario are known and described in 3GPP TS 23.501 V17.2.0, Section 4.3.2. Also, similar architectures for interworking between 5GC via non-3GPP access and E-UTRAN connected to EPC are known and described in 3GPP TS 23.501 V17.2.0, Section 4.3.3. Similar architectures for interworking between ePDG connected to EPC and 5GS are also known and described in 3GPP TS 23.501 V17.2.0, Section 4.3.4. The solutions described herein are applicable to all such architectures in which Network Slice Admission Control (NSAC) with interworking is desired.

Embodiments of the solution described herein relate to, e.g., an inter-AMF handover scenario, e.g., in the system of FIG. 2 or 3 or to an interworking scenario, e.g., in the system of FIG. 4.

Figure 5:
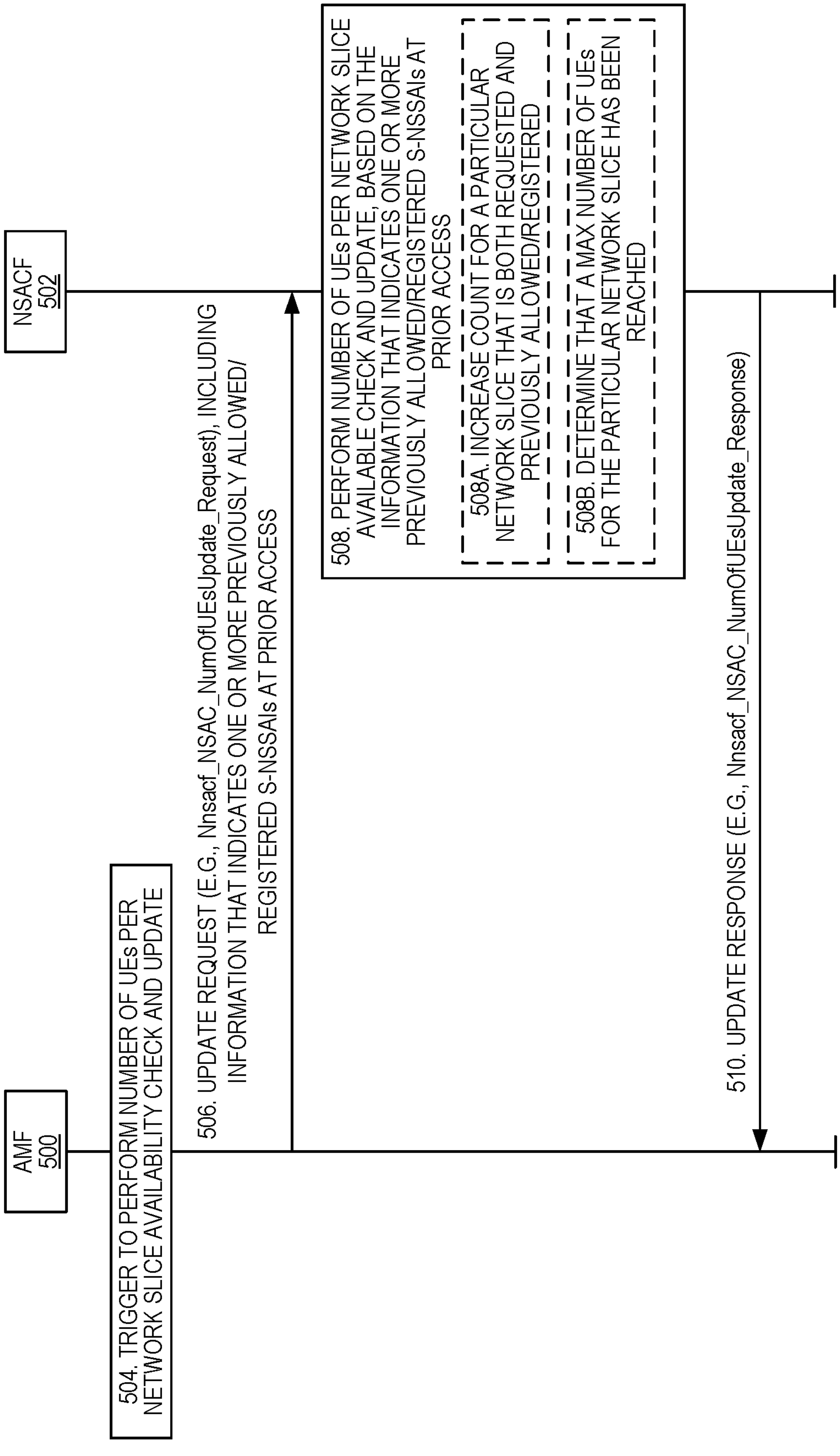
FIG. 5 illustrates a procedure in accordance with an example embodiment of the present disclosure.

FIG. 5 illustrates the operation of an AMF 500 (e.g., AMF 200, e.g., for inter-AMF handover or AMF 408, e.g., for EPC to 5G handover) and a Network Slice Admission Control Function (NSACF) 502 in accordance with one embodiment of the present disclosure. The NSACF 502 is a NF in the 5GC. As illustrated, the AMF 500 determines that a trigger has occurred for performing a number of UEs per network slice availability and update check (step 504). Responsive to the trigger, the AMF 500 sends, to the NSACF 502, a number of UEs per network slice update request (e.g., a Nnsacf_NSAC_NumOfUEsUpdate_Request) to the NSACF 502, where the update request includes information that indicates a requested network slice(s) (e.g. a requested NSSAI(s)) of a respective UE 112 (e.g., a UE 112 being handed over) and information that indicates one or more previously allowed or previously registered network slices (e.g., list of previously allowed NSSAIs) of the respective UE 112 (step 506). The previously allowed/registered network slices are network slices that were allowed/registered at a previous access of the respective UE 112 (e.g., either allowed NSSAIs for the UE 112 in the EPC in the case of EPC to 5G handover or allowed NSSAIs for the UE 112 at the old AMF in the case of inter-AMF handover). Note that the update request of step 506 includes other parameters which are not mentioned here for brevity, as described in the existing 3GPP specifications.

More specifically, for the case of inter-AMF mobility (e.g., inter-AMF handover or at mobility registration update from CM-IDLE), to ensure session continuity during inter-AMF mobility, the new AMF 500 additionally includes in the message of step 506 a list of S-NSSAIs that were allowed by the UE 112 in the old AMF and requested by the UE 112 in the new AMF 500. In the case of interworking (i.e., in support of mobility between 5GC and EPC, e.g., handover or idle mode mobility), session continuity is guaranteed during EPC interworking if an S-NSSAI that is allowed to interwork with 5GC has been subject to NSAC in EPC. In this case, the AMF 500 at initial registration and upon detection of a 5G registration from a UE 112 whose 5G-GUTI is mapped from EPS-GUTI, if configured with information that NSAC is applied in EPC for network slices subject to interworking with EPC for this specific PLMN, includes in its request (i.e., the update request in step 506) the list of S-NSSAIs that were already registered in the EPC to the NSACF 502 (e.g., so in step 508 the NSACF 502 increases the count and does not indicate that the maximum number of UEs registered with the network slice has been reached).

At the NSACF 502, the NSACF 502 uses that information received in the update request of step 506 to perform a number of UEs per network slice availability check and update procedure (step 508). In one embodiment, this procedure is performed such that the NSACF 502 operates as follows: If the requested network slice(s) is indicated as having previously been allowed/registered at the previous access of the UE 112:

- even if the maximum number of UEs has already been reached for the requested network slice(s), the NSACF 502 provides information back to the AMF 500 (and/or in some embodiments the SMF+PGW-C) that will enable granting the UE 112 access to the requested network slice(s) (i.e., it does not indicate that the maximum number of UEs is already reached) (step 510);
- (optional) the NSACF 502 increases the count for the requested network slice(s).

Thus, in one embodiment, performing the number of UEs per network slice availability check and update procedure comprises:

- increasing a count for a number of UEs for a particular network slice that is indicated by the information comprised in the update request as being both requested by the respective UE 112 and previously allowed or registered for the respective UE 112 in the previous access of the respective UE 112 (step 508A),
- determining that a maximum number of UEs has been reached for the particular network slice (step 508B), and
- sending a response to the network node 500 that enables granting the respective UE 112 access to the particular network slice, even though the maximum number of UEs has been reached for the particular network slice Note that for a requested network slice(s), if any, that is not indicated as having been previously allowed/registered in the previous access of the UE 112, the number of UEs per network slice availability check and update procedure may, e.g., be performed in the existing manner defined, e.g., in 3GPP TS 23.501 V17.2.0 and TS 23.502 V17.2.1.

Note that, with respect to steps 508A and 508B, in another embodiment, the maximum number of UEs for the particular network slice may have already been reached before or without increasing the count in step 508A. In this case, the count may or may not be increased in step 508A since the count has already reached its maximum value, depending on the particular implementation.

Note that if the NSACF 502 used in this case did not change from the one used before handover, which is applicable in case of inter-AMF mobility, and where the new AMF 500 is still in the same service area of the old AMF, this list will not result in any change for the S-NSSAIs in the list as they are already registered in that NSACF 502.

Note that, in regard to session continuity for inter-AMF mobility, one option to support that is that the service area is exchanged between the AMFs as part of UE context information. This allows the new AMF to determine if a new NSACF is used. In this case, the new AMF includes the list of S-NSSAI in the old AMF for which the new NSACF increases the count and ignores if the maximum count has been reached.

Note that the procedure of FIG. 5 can also be performed for mobility from 5G to EPC. In this case, the update request of step 506 is sent by the SMF+PGW-C 412, rather than the AMF 500, and the response of step 510 is sent to the SMF+PGW-C 412, rather than the AMF 500.

Figure 6:
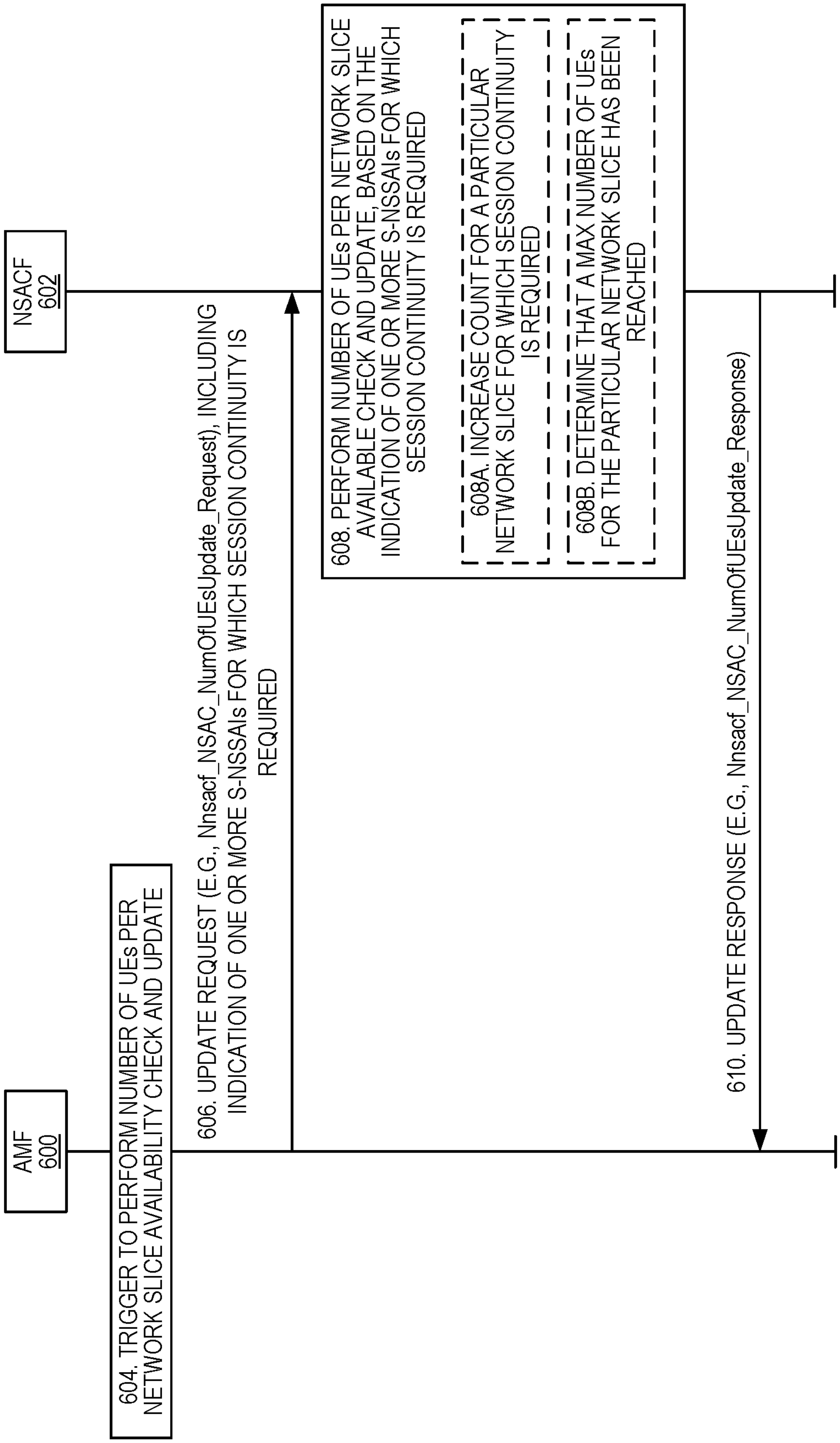
FIGS. 6 and 7 illustrate a procedure in accordance with other example embodiments of the present disclosure.

FIG. 6 illustrates the operation of an AMF 600 (e.g., AMF 200, e.g., for inter-AMF handover or AMF 408, e.g., for EPC to 5G handover) and a NSACF 602 in accordance with another embodiment of the present disclosure. The NSACF 602 is a NF in the 5GC. As illustrated, the AMF 600 determines that a trigger has occurred for performing a number of UEs per network slice availability and update check (step 604). Responsive to the trigger, the AMF 600 sends a number of UEs per network slice update request (e.g., a Nnsacf_NSAC_NumOfUEsUpdate_Request) to the NSACF 602, where the update request includes information that indicates S-NSSAI(s) for which session continuity is required (step 606). In one embodiment, update request includes one or more S-NSSAIs and, for at least one of the one or more S-NSSAIs, information that indicates that session continuity is required for the at least one S-NSSAI. The request may also include an indication (e.g., an "update flag") that indicates that the number of UEs registered per network slice is to be increased.

More specifically, for the case of inter-AMF mobility (e.g., inter-AMF handover or at mobility registration update from CM-IDLE), to ensure session continuity during inter-AMF mobility, the new AMF 600 includes in the message of step 606 an indication for every S-NSSAI for which session continuity is required. In one embodiment, the message of step 606 includes a list(s) of S-NSSAIs and information that indicates S-NSSAI(s) in the list(s) for which session continuity is required. In one embodiment, the indication that session continuity is required is included by the AMF 600 only for the list of S-NSSAIs requested by the respective UE 112 and the S-NSSAIs allowed for the respective UE 112 by the old AMF and obtained by the new AMF 600 from the old AMF, as well as being allowed in the new AMF 600.

In the case of interworking (i.e., in support of mobility between 5GC and EPC, e.g., handover or idle mode mobility), session continuity is guaranteed, from the NSAC perspective, during EPC interworking if an S-NSSAI that is allowed to interwork with 5GC has been subject to NSAC in EPC. In this case, the AMF 600 at initial registration and upon detection of a 5G registration from a UE 112 whose 5G-GUTI is mapped from EPS-GUTI, verifies if the subscription associated with the (e.g., requested, or S-NSSAI subject to IWK) S-NSSAI (e.g., as obtained by the AMF 600 via the procedure of FIG. 7 described below) indicates that the S-NSSAI is subject to EPC interworking and NSAC hence session continuity is to be guaranteed. If so, the AMF 600 includes in the update request of step 606 an indication for the S-NSSAI that session continuity is to be guaranteed. For example, in step 608, the NSACF 602 increases the count and does not indicate that the maximum number of UEs registered with the network slice has been reached, even if the maximum number of UEs registered with the network slice has actually been reached. As another example, if 5GC and EPC have their own separate admission counting, the NSACF 602 increases the count and does not indicate that the maximum number of UEs registered with the network slice has been reached; otherwise, the NSACF 602 does not increase the count.

At the NSACF 602, the NSACF 602 uses that information received in the update request of step 706 to perform a number of UEs per network slice availability check and update procedure (step 608). In one embodiment, this procedure is performed such that the NSACF 602 operates as follows: If the requested network slice(s) (i.e., the requested S-NSSAI(s)) is indicated as being a S-NSSAI for which session continuity is required:

even if the maximum number of UEs has already been reached for the requested network slice(s), the NSACF 602 provides information back to the AMF 600 (and/or in some embodiments the SMF+PGW-C) that will enable granting the UE 112 access to the requested network slice(s) (i.e., it does not indicate that the maximum number of UEs is already reached) (step 610);

(optional) the NSACF 602 increases the count for the requested network slice(s).

Thus, in one embodiment, performing the number of UEs per network slice availability check and update procedure comprises, for a particular network slice (e.g., a particular S-NSSAI) for which the indication that session continuity is required is provided in the update request:

increasing a count for a number of UEs for a particular network slice that is indicated by the information comprised in the update request as being requested by the respective UE 112 and requiring session continuity (step 608A), determining that a maximum number of UEs has been reached for the particular network slice (step 608B), and sending a response to the network node 600 that enables granting the respective UE 112 access to the particular network slice, even though the maximum number of UEs has been reached for the particular network slice, responsive to the required session continuity indication for the particular network slice (step 610).

Note that, with respect to steps 608A and 608B, in another embodiment, the maximum number of UEs for the particular network slice may have already been reached before or without increasing the count in step 608A. In this case, the count may or may not be increased in step 608A since the count has already reached its maximum value, depending on the particular implementation.

In one embodiment, in step 608, if a UE ID of the respective UE 112 is not in a list of UE IDs registered with the network slice and the maximum number of UEs registered with the network slice has not been reached yet, the NSACF 602 adds the UE ID to the list of UEs registered with the network slice as a new entry associated with this new update and increases the current number of the UEs registered with the network slice. If the UE ID is not in the list of UEs registered with that network slice (e.g., with the S-NSSAI) and the maximum number of UEs for that network slice has already been reached, then the NSACF 602 returns (in step 610) a result parameter indicating that the maximum number of UEs registered with the network slice has been reached unless the AMF 600 indicated that the service continuity is required for the network slice (e.g., if the S-NSSAI of the network slice was in the list of S-NSSAIS allowed by the UE in the old AMF, the NSACF increases the count and does not indicate that the maximum number of UEs registered with the network slice has been reached). The NSACF 602 stores the service continuity indication. In one embodiment, if the number of UEs registered with the network slice has been exceeded due to service continuity, the NSACF 602 uses its internally configured policies to select a UE to be deregistered so as to restore the number of registered UEs in the network slice to the maximum (see, e.g., the procedure of FIG. 8 or alternatively the procedure of FIG. 9).

Note that for a requested network slice(s), if any, that is not indicated as requiring session continuity, the number of UEs per network slice availability check and update procedure may, e.g., be performed in the existing manner defined, e.g., in 3GPP TS 23.501 V17.2.0 and TS 23.502 V17.2.1.

Note that the procedure of FIG. 6 can also be performed for mobility from 5G to EPC. In this case, the update request of step 606 is sent by the SMF+PGW-C 412, rather than the AMF 600, and the response of step 610 is sent to the SMF+PGW-C 412, rather than the AMF 600.

Figure 7:
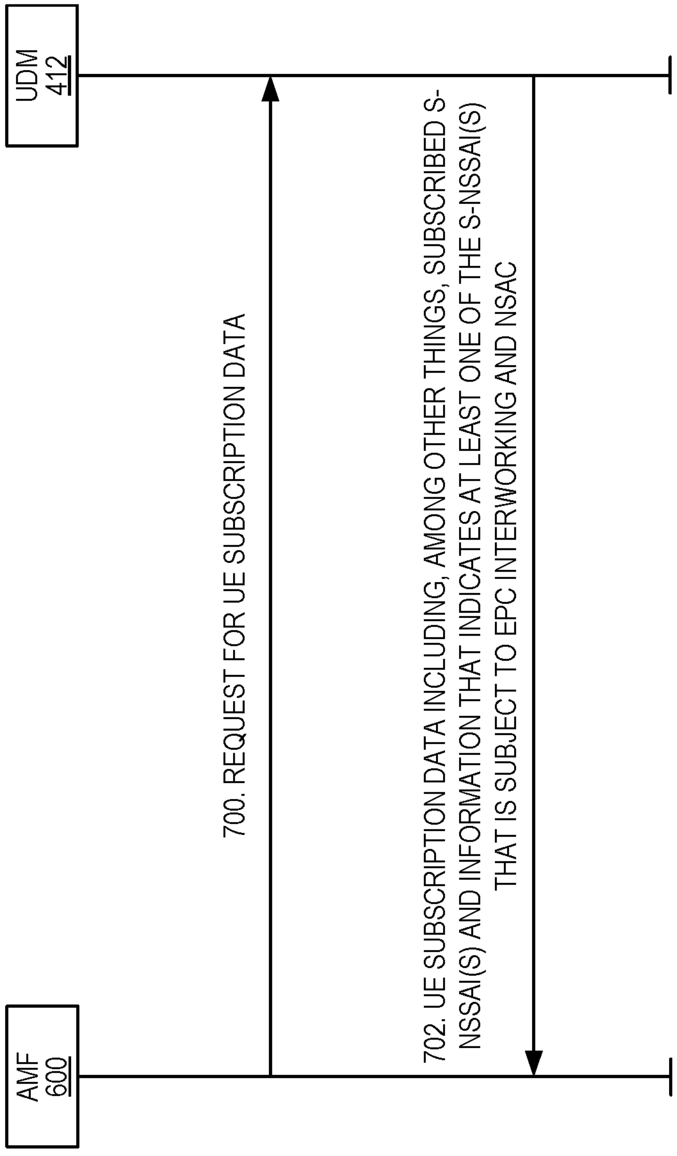

FIG. 7 illustrates a procedure in which the AMF 600 obtains subscription data from the UDM 412, where the subscription data includes information that indicates a subscribed S-NSSAI(s) that is subject to EPC interworking and NSAC in accordance with one embodiment of the present disclosure. Note that this procedure may be performed prior to or after step 604 in the procedure of FIG. 6 in the case of interworking between EPC and 5G (and the UE 112 goes from EPC to 5G). As illustrated, the AMF 600 sends a request to the UDM 412 for UE subscription data for a respective UE 112 (step 700). In response, the UDM 412 sends the UE subscription data for the respective UE 112 to the AMF 600 (step 702). In one embodiment, the UE subscription data includes, among other things, one or more subscribed S-NSSAIs of the UE 112 and information that indicates at least one of the subscribed S-NSSAIs that is subject to EPC interworking and NSAC. In one embodiment, the indication that a subscribed S-NSSAI is subject to EPC interworking and NSAC is an (implicit) indication that session continuity is required for that subscribed S-NSSAI. In another embodiment, for each subscribed S-NSSAI that is subject to EPC interworking and NSAC, the UE subscription data includes an indication on whether this subscribed S-NSSAI is subject to session continuity. Absence of the indication for one or more of the subscribed S-NSSAI indicates that the S-NSSAI is not subject to session continuity. In one embodiment, the indication provided by the UDM corresponds to indicating that the S-NSSAI is subject to EPC interworking and NSAC, which is used by the AMF 600 to determine that session continuity is required. Alternatively, the indication may be another appropriate indication that is used to identify if session continuity is to be applied for the S-NSSAI. Using this information, in step 606, the AMF 600 then provides the indication that session continuity is required for the (subscribed) S-NSSAI(s) that are subject to EPC interworking and NSAC as indicated in the UE subscription data.

Figure 8:
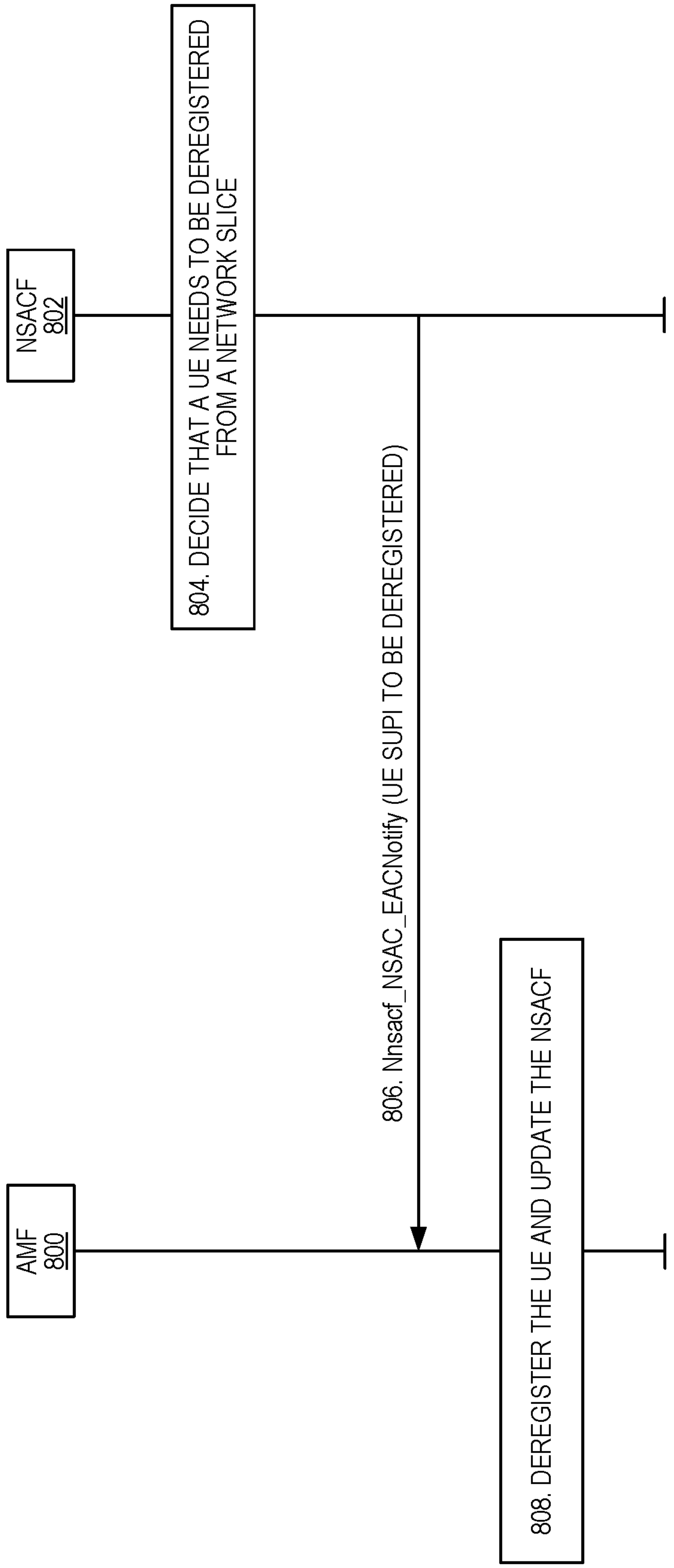
FIGS. 8 and 9 illustrate configurations in accordance with example embodiments of the present disclosure.

FIG. 8 illustrates a configuration for UE deregistration procedure performed by an AMF 800 (e.g., the AMF 600) and NSACF 802 (e.g., NSACF 602) in accordance with one embodiment of the present disclosure. This process may be performed when, for example, the NSACF 802 determines that the maximum number of UEs for a network slice has been exceeded due to session continuity. The configuration for UE deregistration procedure is a procedure in which the NSACF 802 notifies the AMF 700 that a network slice is to be deregistered for a particular UE. The steps of the procedure of FIG. 8 are as follows:

Step 804: The NSACF 802 decides to decrease the number of registered UEs for a network slice (e.g., for an S-NSSAI). For example, the number of UEs registered with the network slice has been exceeded due to service continuity, and the NSACF 802 decides to deregister the network slice for a particular UE. As another example, the configured maximum number of UEs for the network slice has been decreased such that the number of UEs registered with the network slice now exceeds the new, decreased maximum number of UEs for the network slice.

Step 806: The NSACF 802 sends a request (e.g., Nnsacf_NSAC_EACNotify request in this example) to the AMF 800 including the S-NSSAI (for the network slice) of UE ID (e.g., the SUPI) of the particular UE(s) to be deregistered.

Step 808: The AMF 800 deregisters the particular UE from the network slice (e.g., deregisters the UE's S-NSSAI), e.g., using the UE Configuration Update procedure and then updates the NSACF 802 by sending Nnsacf_NSAC_NumOfUEsUpdate_Request, e.g., as per clause 4.2.11.2 of 3GPP TS 23.502 (see, e.g., V17.2.1).

Figure 9:
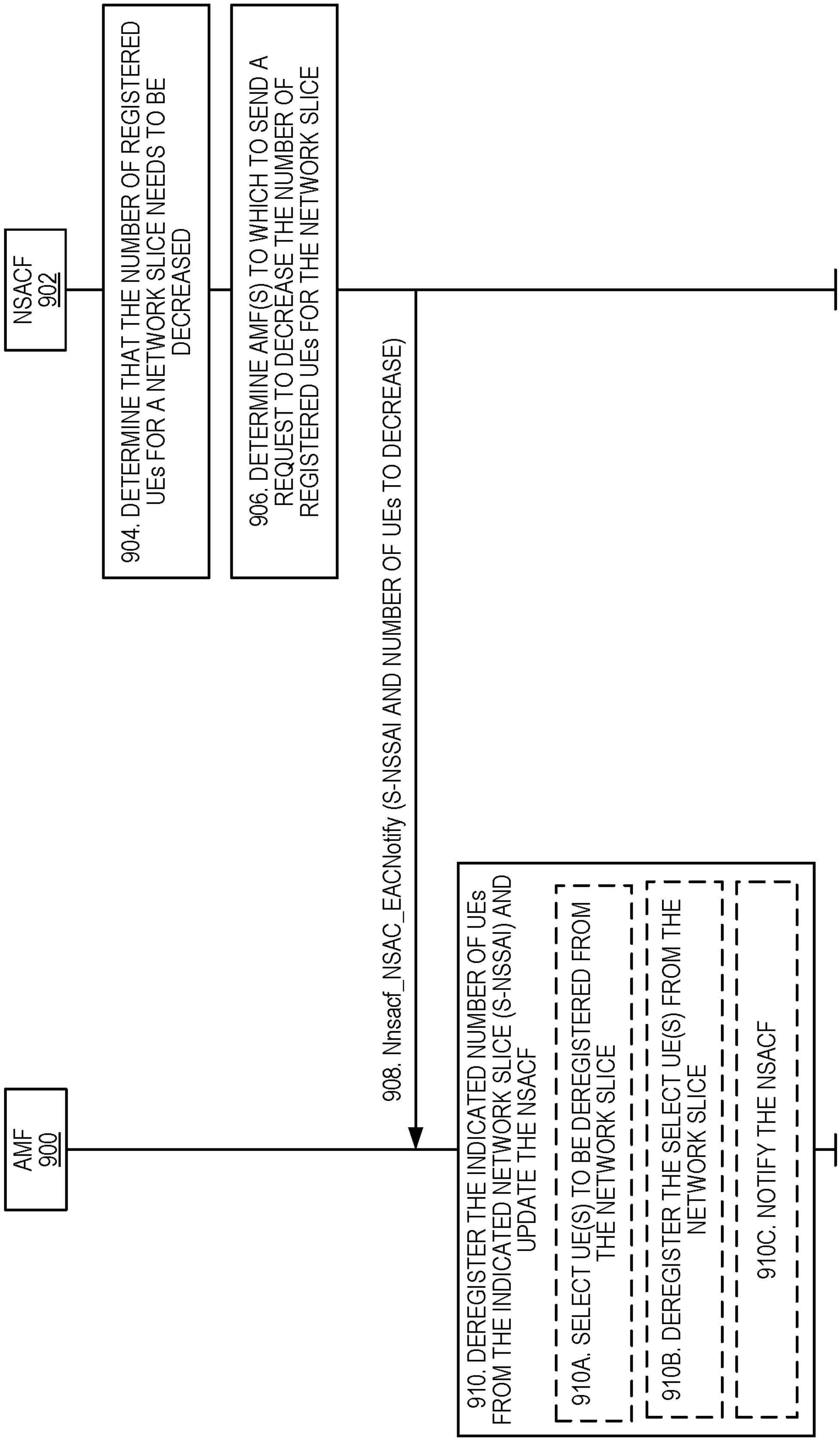

FIG. 9 illustrates an alternative to the configuration for UE deregistration procedure of FIG. 8 in accordance with one embodiment of the present disclosure. The procedure of FIG. 9 is performed by an AMF 900 (e.g., the AMF 600) and NSACF 902 (e.g., NSACF 602). The steps of the procedure of FIG. 9 are as follows:

Step 904: The NSACF 902 determines that the number of registered UEs for a network slice (e.g., for an S-NSSAI) needs to be decreased. For example, the number of UEs registered with the network slice has been exceeded due to service continuity, and the NSACF 902 decides to deregister the network slice for a particular UE. As another example, the maximum number of UEs for the network slice has been decreased such that the number of UEs registered with the network slice now exceeds the new, decreased maximum number of UEs for the network slice.

Step 906: The NSACF 902 determines one or more AMFs 900 to which to send a request to decrease the number of UEs registered to the network slice.

Step 908: The NSACF 902 sends a request (e.g., a Nnsacf_NSAC_EACNotify request in this example) to the determined AMF(s) 900, where the request includes information that indicates the particular network slice (e.g., the S-NSSAI) and the number of UEs to be decreased for that network slice.

Step 910: The AMF 900 determines (i.e., selects) the UE(s) that are to be deregistered for the network slice (e.g., for the indicated S-NSSAI) (step 910A). The number of UEs selected by the AMF 900 for deregistration is the number of UEs as indicated in the request of step 908. For example, the AMF 900 may determine that (a request number of) the UE(s) having the indicated S-NSSAI in Allowed NSSAI that do not have any PDU Session Established for the S-NSSAI are to be deregistered for the network slice. For each of the determined UE(s), the AMF 900 deregisters the determined UE(s) from the network slice (step 910B). For example, for each of the determined UE(s), the AMF 900 removes the S-NSSAI from the Allowed NSSAI for that UE and triggers a UE Configuration Update procedure towards the UE. The AMF 900 updates the NSACF 902, e.g., by sending an Nnsacf_NSAC_NumOfUEsUpdate_Request as per clause 4.2.11.2 of 3GPP TS 23.502 (see, e.g., V17.2.1) (step 910C).

Many of the example embodiments described herein assume that 5GC and EPC do not have joint admission counting. However, in some other embodiments, 5GC and EPC have joint admission counting via a common NSACF for 5GC and EPC admission control. In one embodiment, this common NSACF for 5GC and EPC admission control has an NSACF service area and is distinctly and unambiguously identified for that purpose. In one embodiment, a PLMN has only one NSACF for that purpose used by both EPC and 5GC for admission purposes. This common NSACF is utilized for home and outbound roamers. Hence, VPLMNs handling inbound roamers use the NSACF of the HPLMN of the inbound roamers dedicated for 5GC EPC interworking for admission purposes. In operation, when the common NSACF receives an update request that indicates for the S-NSSAI that session continuity is to be guaranteed, the common NSACF does not increase the count.

Figure 10:
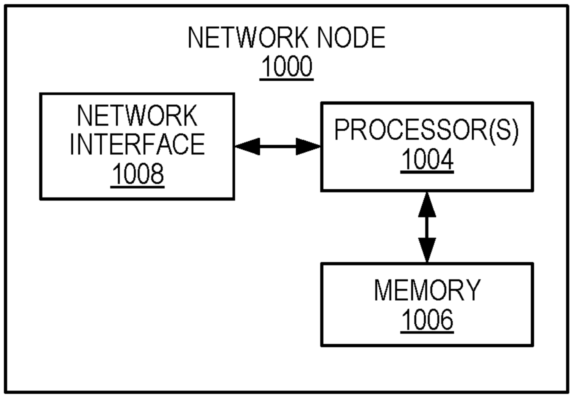
FIGS. 10, 11, and 12 are schematic block diagrams of example embodiments of a network node in which embodiments of the present disclosure may be implemented.

FIG. 10 is a schematic block diagram of a network node 1000 according to some embodiments of the present disclosure. Optional features are represented by dashed boxes. The network node 1000 may be, for example, a network node that implements all or some of the functionality of a NF in the 5GC, a NF in the EPC, or a combined NF (e.g., AMF 500, NSACF 502, SMF/PGW-C 214, AMF 600, NSACF 602, etc.) in accordance with any of the embodiments described herein. As illustrated, the network node 1000 includes one or more processors 1004 (e.g., Central Processing Units (CPUs), Application Specific Integrated Circuits (ASICs), Field Programmable Gate Arrays (FPGAs), and/or the like), memory 1006, and a network interface 1008. The one or more processors 1004 are also referred to herein as processing circuitry. The one or more processors 1004 operate to provide one or more functions of the network node 1000 as described herein. In some embodiments, the function(s) are implemented in software that is stored, e.g., in the memory 1006 and executed by the one or more processors 1004.

Figure 11:
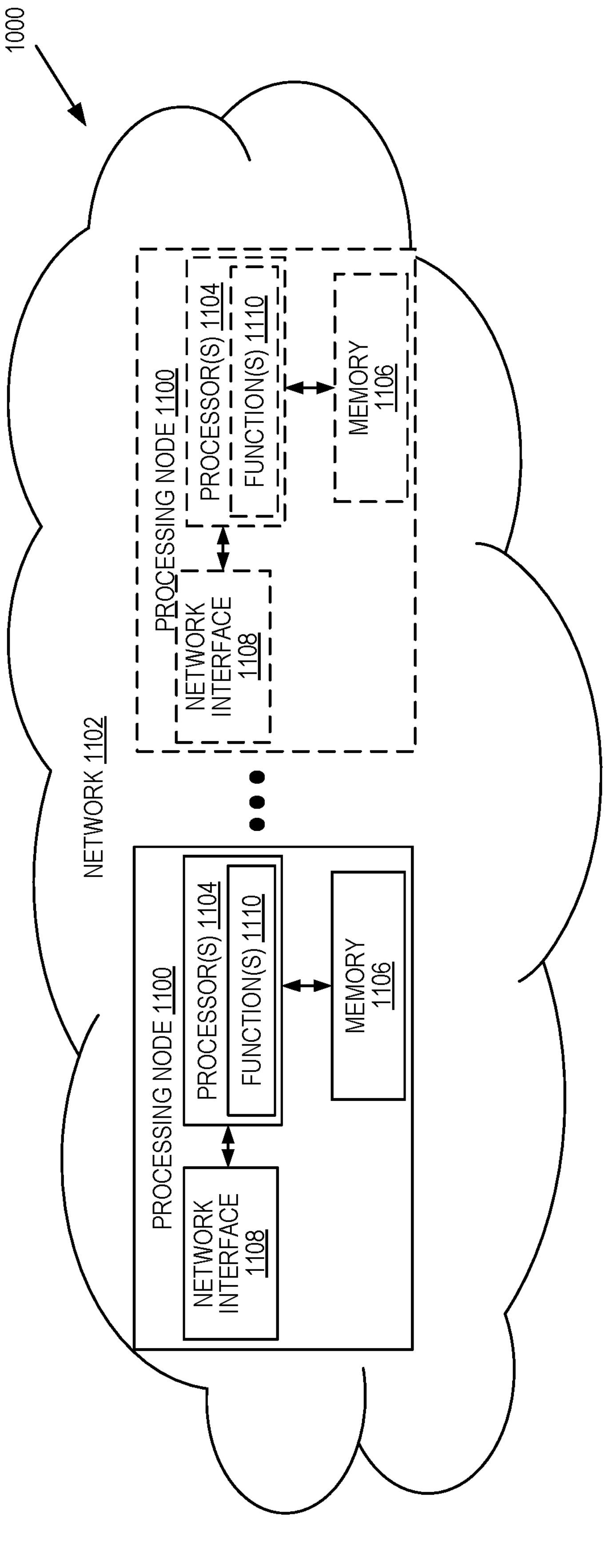

FIG. 11 is a schematic block diagram that illustrates a virtualized embodiment of the network node 1000 according to some embodiments of the present disclosure. This discussion is equally applicable to other types of network nodes. Further, other types of network nodes may have similar virtualized architectures. Again, optional features are represented by dashed boxes.

As used herein, a "virtualized" network node is an implementation of the network node 1000 in which at least a portion of the functionality of the network node 1000 is implemented as a virtual component(s) (e.g., via a virtual machine(s) executing on a physical processing node(s) in a network(s)). As illustrated, in this example, the network node 1000 includes one or more processing nodes 1100 coupled to or included as part of a network(s) 1102. If present, the control system 1002 or the radio unit(s) are connected to the processing node(s) 1100 via the network 1102. Each processing node 1100 includes one or more processors 1104 (e.g., CPUs, ASICs, FPGAS, and/or the like), memory 1106, and a network interface 1108.

In this example, functions 1110 of the network node 1000 described herein are implemented at the one or more processing nodes 1100 or distributed across the two or more processing nodes 1100 in any desired manner. In some particular embodiments, some or all of the functions 1110 of the network node 1000 described herein are implemented as virtual components executed by one or more virtual machines implemented in a virtual environment(s) hosted by the processing node(s) 1100.

In some embodiments, a computer program including instructions which, when executed by at least one processor, causes the at least one processor to carry out the functionality of the network node 1000 or a node (e.g., a processing node 1100) implementing one or more of the functions 1110 of the network node 1000 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
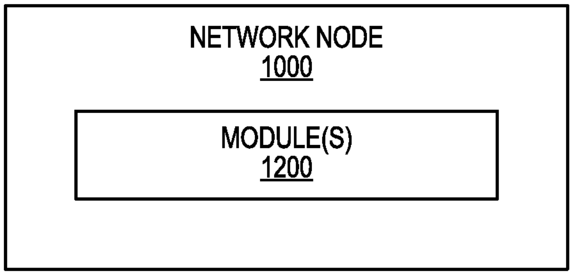

FIG. 12 is a schematic block diagram of the network node 1000 according to some other embodiments of the present disclosure. The network node 1000 includes one or more modules 1200, each of which is implemented in software. The module(s) 1200 provide the functionality of the network node 1000 described herein. This discussion is equally applicable to the processing node 1100 of FIG. 11 where the modules 1200 may be implemented at one of the processing nodes 1100 or distributed across multiple processing nodes 1100.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A method performed in a cellular communications system (100) to ensure session continuity during mobility, the method comprising:

at a network node (500; 414):

sending (506), to a Network Slice Admission Control Function, NSACF, (502), an update request that comprises: (a) information that indicates one or more network slices requested by a respective User Equipment, UE, (112) and (b) information that indicates one or more network slices previously allowed or registered for the respective UE (112) in a previous access of the respective UE (112); and at the NSACF (502):

receiving (506) the update request; and performing (508) a number of UEs per network slice availability check and update procedure based on the information comprised in the update request.

Embodiment 2: The method of embodiment 1 wherein performing (508) the number of UEs per network slice availability check and update procedure based on the information comprised in the update request comprises: increasing (508A) a count for a number of UEs for a particular network slice that is indicated by the information comprised in the update request as being both requested by the respective UE (112) and previously allowed or registered for the respective UE (112) in the previous access of the respective UE (112); determining (508B) that a maximum number of UEs has been reached for the particular network slice; and sending (510) a response to the network node (500; 412) that enables granting the respective UE (112) access to the particular network slice, even though the maximum number of UEs has been reached for the particular network slice.

Embodiment 3: The method of embodiment 1 or 2 wherein the network node (500) is an AMF (500), and sending (506) the update request to the NSACF (502) is triggered in association with an inter-AMF mobility of the respective UE (112) from an old AMF to the AMF (500).

Embodiment 4: The method of embodiment 3 wherein service areas are exchanged between the AMF (500) and the old AMF (e.g., as part of UE context information).

Embodiment 5: The method of embodiment 1 or 2 wherein the network node (500) is an AMF (500), and sending (506) the update request to the NSACF (502) is triggered in association with mobility of the respective UE (112) from an EPC to 5G where the particular network slice is allowed to interwork between EPC and 5GC.

Embodiment 6: The method of embodiment 1 or 2 wherein the network node (412) is an SMF+PGW-C (412), and sending (506) the update request to the NSACF (502) is triggered in association with mobility of the respective UE (112) from 5G to EPC where the particular network slice is allowed to interwork between EPC and 5GC.

Embodiment 7: A method performed by a network node (500; 412) for a cellular communications system (100) to ensure session continuity during mobility, the method comprising: sending (506), to a Network Slice Admission Control Function, NSACF, (502), an update request that comprises: (a) information that indicates one or more network slices requested by a respective User Equipment, UE, (112) and (b) information that indicates one or more network slices previously allowed or registered for the respective UE (112) in a previous access of the respective UE (112); and receiving (510), from the NSACF (502), a response that enables granting the respective UE (112) access to the particular network slice, even if a maximum number of UEs has already been reached for the particular network slice.

Embodiment 8: The method of embodiment 7 wherein the network node (500) is an AMF (500), and sending (506) the update request to the NSACF (502) is triggered in association with an inter-AMF mobility of the respective UE (112) from an old AMF to the AMF (500).

Embodiment 9: The method of embodiment 7 wherein the network node (500) is an AMF (500), and sending (506) the update request to the NSACF (502) is triggered in association with mobility of the respective UE (112) from an EPC to 5G where the particular network slice is allowed to interwork between EPC and 5GC.

Embodiment 10: The method of embodiment 7 wherein the network node (412) is an SMF+PGW-C (412), and sending (506) the update request to the NSACF (502) is triggered in association with mobility of the respective UE (112) from 5G to EPC where the particular network slice is allowed to interwork between EPC and 5GC.

Embodiment 11: A method performed by a Network Slice Admission Control Function, NSACF, (502) for a cellular communications system (100) to ensure session continuity during mobility, the method comprising: receiving (506), from a network node (500; 412), an update request that comprises information that comprises: (a) information that indicates one or more network slices requested by a respective User Equipment, UE, (112) and (b) one or more network slices previously allowed or registered for the respective UE (112) in a previous access of the respective UE (112); and performing (508) a number of UEs per network slice availability check and update procedure based on the information comprised in the update request.

Embodiment 12: The method of embodiment 11 wherein performing (508) the number of UEs per network slice availability check and update procedure based on the information comprised in the update request comprises: increasing (508A) a count for a number of UEs for a particular network slice that is indicated by the information comprised in the update request as being both requested by the respective UE (112) and previously allowed or registered for the respective UE (112) in the previous access of the respective UE (112); determining (508B) that a maximum number of UEs has been reached for the particular network slice; and sending (510) a response to the network node (500) that enables granting the respective UE (112) access to the particular network slice, even though the maximum number of UEs has been reached for the particular network slice.

Embodiment 13: The method of embodiment 11 or 12 wherein the network node (500) is an AMF (500), and receiving (506) the update request is in association with an inter-AMF mobility of the respective UE (112) from an old AMF to the AMF (500).

Embodiment 14: The method of embodiment 11 or 12 wherein the network node (500) is an AMF (500), and receiving (506) the update request is in association with mobility of the respective UE (112) from an EPC to 5G where the particular network slice is allowed to interwork between EPC and 5GC.

Embodiment 15: The method of embodiment 11 or 12 wherein the network node (412) is an SMF+PGW-C (412), and sending (506) the update request to the NSACF (502) is triggered in association with mobility of the respective UE (112) from 5G to EPC where the particular network slice is allowed to interwork between EPC and 5CG.

Embodiment 16: A network node (1000) adapted to perform the method of any of embodiments 7 to 15.

Embodiment 17: A method performed in a cellular communications system (100) to ensure session continuity during mobility, the method comprising:

at a network node (600; 414):

sending (606), to a Network Slice Admission Control Function, NSACF, (602), an update request that comprises information that indicates one or more network slices for which session continuity is required; and at the NSACF (602):

receiving (606) the update request; and performing (608) a number of UEs per network slice availability check and update procedure based on the information comprised in the update request.

Embodiment 18: The method of embodiment 17 wherein performing (608) the number of UEs per network slice availability check and update procedure based on the information comprised in the update request comprises, for a particular network slice for which the information comprised in the update request indicates session continuity is required: increasing (608A) a count for a number of UEs for the particular network slice; determining (608B) that a maximum number of UEs has been reached for the particular network slice; and sending (610) a response to the network node (500; 412) that enables granting a respective UE (112) access to the particular network slice, even though the maximum number of UEs has been reached for the particular network slice.

Embodiment 19: The method of embodiment 17 or 18 wherein the network node (600) is an AMF (600), and sending (606) the update request to the NSACF (602) is triggered in association with an inter-AMF mobility of a respective UE (112) from an old AMF to the AMF (600).

Embodiment 20: The method of embodiment 19 wherein the update request comprises information that indicates one or more allowed network slices for the respective UE (112), and the one or more network slices for which session continuity is required comprise at least one of the one or more allowed network slices for the respective UE (112).

Embodiment 21: The method of embodiment 19 or 20 wherein information that indicates the one or more network slices for which session continuity is required comprises an indication that session continuity is required only for network slices requested by the respective UE (112) and network slices allowed for the respective UE (112) by the old AMF and obtained by the new AMF (600) from the old AMF, as well as being allowed in the new AMF (600).

Embodiment 22: The method of embodiment 17 or 18 wherein: the network node (600) is an AMF (600); sending (606) the update request to the NSACF (602) is triggered in association with mobility of the respective UE (112) from an EPC to 5G, for a particular network slice that allowed to interwork between EPC and 5CG; and the particular network slice is one of the one or more network slices indicated by the information comprised in the update request as requiring session continuity.

Embodiment 23: The method of embodiment 22 further comprising:

at the AMF (600):

sending (700), to a UDM (412), a request for subscription data for the respective UE (112); and receiving (702), from the UDM (412), a response comprising UE subscription data for the respective UE (112), the UE subscription data comprising information that indicates one or more subscribed S-NSSAIs of the respective UE (112) that are subject to EPC interworking and NSAC and hence require session continuity;

wherein the one or more network slices for which session continuity is required comprises at least one network slice that corresponds to at least one of the one or more subscribed S-NSSAIs indicated by the UE subscription data as being subject to EPC interworking and NSAC.

Embodiment 24: The method of embodiment 17 or 18 wherein: the network node is an SMF+PGW-C (412); sending (606) the update request to the NSACF (602) is triggered in association with mobility of the respective UE (112) from 5G to EPC for a particular network slice that is allowed to interwork between EPC and 5CG; and the particular network slice is one of the one or more network slices indicated by the information comprised in the update request as requiring session continuity.

Embodiment 25: The method of embodiment 17 wherein, at the NSACF (602), performing (608) the number of UEs per network slice availability check and update procedure based on the information comprised in the update request further comprises:

for a particular network slice for which the information comprised in the update request indicates session continuity is required:

increasing (608A) a count for a number of UEs for the particular network slice;

determining (608B) that a maximum number of UEs has been exceeded for the particular network slice; and sending (610) a response to the network node (500; 412) that enables granting a respective UE (112) access to the particular network slice, even though the maximum number of UEs has been reached for the particular network slice.

Embodiment 26: The method of embodiment 25 wherein, at the NSACF (602), performing (608) the number of UEs per network slice availability check and update procedure based on the information comprised in the update request further comprises: determining (804) that a particular UE needs to be deregistered from the particular network slice responsive to determining (608B) that the maximum number of UEs has been exceeded for the particular network slice; and sending (806), to the network node (800), a request to deregister the particular UE from the particular network slice.

Embodiment 27: The method of embodiment 25 wherein: at the NSACF (902), performing (608) the number of UEs per network slice availability check and update procedure based on the information comprised in the update request further comprises:

determining (904) that a number of registered UEs for the particular network slice needs to be decreased responsive to determining (608B) that the maximum number of UEs has been exceeded for the particular network slice;

sending (908), to the network node (900), a request to deregister one or more UE from the particular network slice, the request comprising information that indicates: (a) the particular network slice and (b) the number of UEs to be deregistered from the particular network slice; and at the network node (900), the method further comprises:

receiving (908) the request from the NSACF (902);

selecting (910A) one or more UEs to be deregistered from the particular network slice, where the number of UEs selected corresponds to the number of UEs indicated in the request; and deregistering (910B) the selected one or more UEs from the particular network slice.

Embodiment 28: The method of any of embodiments 17 to 27 wherein the network node (600; 414) is a network node in a first core network (e.g., 5GC), the previous access of the respective UE (112) is associated to a second core network (e.g., EPC), and separate admission counting per network slice is performed for the first core network and the second core network.

Embodiment 29: The method of any of embodiments 17 and 19 to 24 wherein the network node (600; 414) is a network node in a first core network (e.g., 5GC), the previous access of the respective UE (112) is associated to a second core network (e.g., EPC), and the NSACF (602) is a common NSACF that performs joint admission counting per network slice for both the first core network and the second core network.

Embodiment 30: A method performed by a network node (600; 414) for a cellular communications system (100) to ensure session continuity during mobility, the method comprising: sending (606), to a Network Slice Admission Control Function, NSACF, (602), an update request that comprises information that indicates one or more network slices for which session continuity is required.

Embodiment 31: The method of embodiment 30 wherein the network node (600) is an AMF (600), and sending (606) the update request to the NSACF (602) is triggered in association with an inter-AMF mobility of a respective UE (112) from an old AMF to the AMF (600).

Embodiment 32: The method of embodiment 31 wherein the update request comprises information that indicates one or more allowed network slices for the respective UE (112), and the one or more network slices for which session continuity is required comprise at least one of the one or more allowed network slices for the respective UE (112).

Embodiment 33: The method of embodiment 31 or 32 wherein information that indicates the one or more network slices for which session continuity is required comprises an indication that session continuity is required only for network slices requested by the respective UE (112) and network slices allowed for the respective UE (112) by the old AMF and obtained by the new AMF (600) from the old AMF, as well as being allowed in the new AMF (600).

Embodiment 34: The method of embodiment 30 wherein: the network node (600) is an AMF (600); sending (606) the update request to the NSACF (602) is triggered in association with mobility of the respective UE (112) from an EPC to 5G, for a particular network slice that allowed to interwork between EPC and 5CG; and the particular network slice is one of the one or more network slices indicated by the information comprised in the update request as requiring session continuity.

Embodiment 35: The method of embodiment 34 further comprising: sending (700), to a UDM (412), a request for subscription data for the respective UE (112); and receiving (702), from the UDM (412), a response comprising UE subscription data for the respective UE (112), the UE subscription data comprising information that indicates one or more subscribed S-NSSAIs of the respective UE (112) that are subject to EPC interworking and NSAC and hence require session continuity; wherein the one or more network slices for which session continuity is required comprises at least one network slice that corresponds to at least one of the one or more subscribed S-NSSAIs indicated by the UE subscription data as being subject to EPC interworking and NSAC.

Embodiment 36: The method of embodiment 30 wherein: the network node is an SMF+PGW-C (412); sending (606) the update request to the NSACF (602) is triggered in association with mobility of the respective UE (112) from 5G to EPC for a particular network slice that is allowed to interwork between EPC and 5CG; and the particular network slice is one of the one or more network slices indicated by the information comprised in the update request as requiring session continuity.

Embodiment 37: The method of any of embodiments 30 further comprising: receiving (806), from the NSACF (802), a request to deregister a particular UE from a particular network slice; and deregistering (808) the particular UE from the particular network slice.

Embodiment 38: The method of any of embodiments 30 further comprising: receiving (908), from the NSACF (902), a request to deregister one or more UE from the particular network slice, the request comprising information that indicates: (a) the particular network slice and (b) the number of UEs to be deregistered from the particular network slice; selecting (910A) one or more UEs to be deregistered from the particular network slice, where the number of UEs selected corresponds to the number of UEs indicated in the request; and deregistering (910B) the selected one or more UEs from the particular network slice.

Embodiment 39: The method of any of embodiments 30 to 38 wherein the network node (600; 414) is a network node in a first core network (e.g., 5GC), the previous access of the respective UE (112) is associated to a second core network (e.g., EPC), and separate admission counting per network slice is performed for the first core network and the second core network.

Embodiment 40: The method of any of embodiments 30 to 38 wherein the network node (600; 414) is a network node in a first core network (e.g., 5GC), the previous access of the respective UE (112) is associated to a second core network (e.g., EPC), and the NSACF (602) is a common NSACF that performs joint admission counting per network slice for both the first core network and the second core network.

Embodiment 41: A method performed by a Network Slice Admission Control Function, NSACF, for a cellular communications system (100) to ensure session continuity during mobility, the method comprising: receiving (606), from a network node (600; 412), an update request that comprises information that indicates one or more network slices for which session continuity is required; and performing (608) a number of UEs per network slice availability check and update procedure based on the information comprised in the update request.

Embodiment 42: The method of embodiment 41 wherein performing (608) the number of UEs per network slice availability check and update procedure based on the information comprised in the update request comprises, for a particular network slice for which the information comprised in the update request indicates session continuity is required: increasing (608A) a count for a number of UEs for the particular network slice; determining (608B) that a maximum number of UEs has been reached for the particular network slice; and sending (610) a response to the network node (500; 412) that enables granting a respective UE (112) access to the particular network slice, even though the maximum number of UEs has been reached for the particular network slice.

Embodiment 43: The method of embodiment 41 or 42 wherein the network node (600) is an AMF (600), and the update request is received in association with an inter-AMF mobility of a respective UE (112) from an old AMF to the AMF (600).

Embodiment 44: The method of embodiment 43 wherein the update request comprises information that indicates one or more allowed network slices for the respective UE (112), and the one or more network slices for which session continuity is required comprise at least one of the one or more allowed network slices for the respective UE (112).

Embodiment 45: The method of embodiment 43 or 44 wherein information that indicates the one or more network slices for which session continuity is required comprises an indication that session continuity is required only for network slices requested by the respective UE (112) and network slices allowed for the respective UE (112) by the old AMF and obtained by the new AMF (600) from the old AMF, as well as being allowed in the new AMF (600).

Embodiment 46: The method of embodiment 41 or 42 wherein: the network node (600) is an AMF (600); the update request is received in association with mobility of the respective UE (112) from an EPC to 5G, for a particular network slice that allowed to interwork between EPC and 5CG; and the particular network slice is one of the one or more network slices indicated by the information comprised in the update request as requiring session continuity.

Embodiment 47: The method of embodiment 41 or 42 wherein: the network node is an SMF+PGW-C (412); the update request is received in association with mobility of the respective UE (112) from 5G to EPC for a particular network slice that is allowed to interwork between EPC and 5CG; and the particular network slice is one of the one or more network slices indicated by the information comprised in the update request as requiring session continuity.

Embodiment 48: The method of embodiment 41 wherein performing (608) the number of UEs per network slice availability check and update procedure based on the information comprised in the update request further comprises:

for a particular network slice for which the information comprised in the update request indicates session continuity is required:

increasing (608A) a count for a number of UEs for the particular network slice;

determining (608B) that a maximum number of UEs has been exceeded for the particular network slice; and sending (610) a response to the network node (500; 412) that enables granting a respective UE (112)

access to the particular network slice, even though the maximum number of UEs has been reached for the particular network slice.

Embodiment 49: The method of embodiment 48 wherein performing (608) the number of UEs per network slice availability check and update procedure based on the information comprised in the update request further comprises: determining (804) that a particular UE needs to be deregistered from the particular network slice responsive to determining (608B) that the maximum number of UEs has been exceeded for the particular network slice; and sending (806), to the network node (800), a request to deregister the particular UE from the particular network slice.

Embodiment 50: The method of embodiment 48 wherein performing (608) the number of UEs per network slice availability check and update procedure based on the information comprised in the update request further comprises: determining (904) that a number of registered UEs for the particular network slice needs to be decreased responsive to determining (608B) that the maximum number of UEs has been exceeded for the particular network slice; sending (908), to the network node (900), a request to deregister one or more UE from the particular network slice, the request comprising information that indicates: (a) the particular network slice and (b) the number of UEs to be deregistered from the particular network slice.

Embodiment 51: The method of any of embodiments 41 to 50 wherein the network node (600; 414) is a network node in a first core network (e.g., 5GC), the previous access of the respective UE (112) is associated to a second core network (e.g., EPC), and separate admission counting per network slice is performed for the first core network and the second core network.

Embodiment 52: The method of any of embodiments 41 and 43 to 47 wherein the network node (600; 414) is a network node in a first core network (e.g., 5GC), the previous access of the respective UE (112) is associated to a second core network (e.g., EPC), and the NSACF (602) is a common NSACF that performs joint admission counting per network slice for both the first core network and the second core network.

Embodiment 53: A method performed by a first network node (e.g., UDM 412) for a cellular communications system (100): receiving (700), from a second network node (e.g., AMF 600), a request for subscription data for a respective UE (112); and sending (702), to the second network node, a response comprising UE subscription data for the respective UE (112), the UE subscription data comprising information that indicates one or more subscribed S-NSSAIs of the respective UE (112) that are subject to EPC interworking and NSAC and hence require session continuity.

Embodiment 54: A method performed by a Network Slice Admission Control Function, NSACF, (802) for a cellular communications system (100), the method comprising: determining (804) that a particular User Equipment, UE, needs to be deregistered from a particular network slice; and sending (806) a request to a network node (800) to deregister the particular UE from the particular network slice.

Embodiment 55: The method of embodiment 54 wherein determining (804) that the particular UE needs to be deregistered from the particular network slice comprises determining (804) that the particular UE needs to be deregistered from the particular network slice due to a number of registered UEs for the particular network slice exceeding a defined maximum number of registered UEs for the particular network slice (e.g., due to an increase in the number of registered UEs for the network slice due to service continuity or due to a decrease in the defined maximum number of UEs for the network slice to a value that is less than the number of registered UEs for the network slice).

Embodiment 56: A method performed by a Network Slice Admission Control Function, NSACF, (902) for a cellular communications system (100), the method comprising: determining (904) that a number of User Equipment, UEs, needs to be deregistered from a particular network slice; and sending (908) a request to a network node (900) to deregister one or more UEs from the particular network slice, the request comprising information that indicates: (a) the particular network slice and (b) the determined number of UEs to be deregistered from the particular network slice.

Embodiment 57: The method of embodiment 56 wherein determining (904) that the particular UE needs to be deregistered from the particular network slice comprises determining (904) that the particular UE needs to be deregistered from the particular network slice due to a number of registered UEs for the particular network slice exceeding a defined maximum number of registered UEs for the particular network slice (e.g., due to an increase in the number of registered UEs for the network slice due to service continuity or due to a decrease in the defined maximum number of UEs for the network slice to a value that is less than the number of registered UEs for the network slice).

Embodiment 58: A network node (1000) adapted to perform the method of any of embodiments 30 to 57.

Those skilled in the art will recognize improvements and modifications to the embodiments of the present disclosure. All such improvements and modifications are considered within the scope of the concepts disclosed herein.

The invention claimed is:

1. A method performed by a Network Slice Admission Control Function, NSACF, for a communications system, the method comprising:

determining that one or more User Equipments, UEs, need to be deregistered from a particular network slice; and responsive to determining that one or more UEs need to be deregistered from the particular network slice, sending a request to a network node to deregister one or more UEs from the particular network slice, wherein determining that one or more UEs need to be deregistered from the particular network slice comprises determining that a number of UEs needs to be deregistered from the particular network slice;

wherein the request sent to the network node comprises a request to deregister the determined number of UEs from the particular network slice; and wherein determining that the number of UEs needs to be deregistered from the particular network slice comprises determining that the number of UEs needs to be deregistered from the particular network slice due to:

a number of registered UEs for the particular network slice exceeding a defined maximum number of registered UEs for the particular network slice;

a number of registered UEs for the particular network slice exceeding a defined maximum number of registered UEs for the particular network slice due to an increase in the number of registered UEs for the network slice due to service continuity; or a number of registered UEs for the particular network slice exceeding a defined maximum number of registered UEs for the particular network slice due to a decrease in the defined maximum number of UEs for the network slice to a value that is less than the number of registered UEs for the network slice.

2. The method of claim 1 wherein:

determining that one or more UEs need to be deregistered from the particular network slice comprises determining that a particular UE needs to be deregistered from the particular network slice; and the request sent to the network node comprises a request to deregister the particular UE from the particular network slice.

3. The method of claim 2 wherein determining that the particular UE needs to be deregistered from the particular network slice comprises determining that the particular UE needs to be deregistered from the particular network slice due to a number of registered UEs for the particular network slice exceeding a defined maximum number of registered UEs for the particular network slice.

4. The method of claim 2 wherein determining that the particular UE needs to be deregistered from the particular network slice comprises determining that the particular UE needs to be deregistered from the particular network slice due to a number of registered UEs for the particular network slice exceeding a defined maximum number of registered UEs for the particular network slice due to an increase in the number of registered UEs for the network slice due to service continuity.

5. The method of claim 2 wherein determining that the particular UE needs to be deregistered from the particular network slice comprises determining that the particular UE needs to be deregistered from the particular network slice due to a number of registered UEs for the particular network slice exceeding a defined maximum number of registered UEs for the particular network slice due to a decrease in the defined maximum number of UEs for the network slice to a value that is less than the number of registered UEs for the network slice.

6. The method of claim 1 wherein the request comprises information that indicates: (a) the particular network slice and (b) the determined number of UEs to be deregistered from the particular network slice.

7. The method of claim 1 wherein determining that the number of UEs needs to be deregistered from the particular network slice comprises determining that the number of UEs needs to be deregistered from the particular network slice due to a number of registered UEs for the particular network slice exceeding a defined maximum number of registered UEs for the particular network slice.

8. The method of claim 1 wherein determining that the number of UEs needs to be deregistered from the particular network slice comprises determining that the number of UEs needs to be deregistered from the particular network slice due to a number of registered UEs for the particular network slice exceeding a defined maximum number of registered UEs for the particular network slice due to an increase in the number of registered UEs for the network slice due to service continuity.

9. The method of claim 1 wherein determining that the number of UEs needs to be deregistered from the particular network slice comprises determining that the number of UEs needs to be deregistered from the particular network slice due to a number of registered UEs for the particular network slice exceeding a defined maximum number of registered UEs for the particular network slice due to a decrease in the defined maximum number of UEs for the network slice to a value that is less than the number of registered UEs for the network slice.

10. The method of claim 1 wherein determining that one or more UEs need to be deregistered from a particular network slice comprises:

receiving, from a network node, an update request that comprises information that comprises: (a) information that indicates one or more network slices requested by a respective UE and (b) one or more network slices previously allowed or registered for the respective UE in a previous access of the respective UE; and performing a number of UEs per network slice availability check and update procedure based on the information comprised in the update request.

11. The method of claim 10 wherein performing the number of UEs per network slice availability check and update procedure comprises determining that one or more UEs need to be deregistered from the particular network slice based on a result of performing the number of UEs per network slice availability check and update procedure.

12. The method of claim 10 wherein performing the number of UEs per network slice availability check and update procedure based on the information comprised in the update request further comprises:

increasing a count for a number of UEs for the particular network slice, which is indicated by the information comprised in the update request as being both requested by the respective UE and previously allowed or registered for the respective UE in the previous access of the respective UE;

determining that a maximum number of UEs has been reached for the particular network slice; and sending a response to the network node that enables granting the respective UE access to the particular network slice, even though the maximum number of UEs has been reached for the particular network slice.

13. A network node for implementing a Network Slice Admission Control Function, NSACF, for a communications system, the network node comprising processing circuitry configured to cause the network node to:

determine that one or more User Equipments, UEs, need to be deregistered from a particular network slice; and responsive to determining that one or more UEs need to be deregistered from the particular network slice, send a request to a network node to deregister one or more UEs from the particular network slice, wherein determining that one or more UEs need to be deregistered from the particular network slice comprises determining that a number of UEs needs to be deregistered from the particular network slice;

wherein the request sent to the network node comprises a request to deregister the determined number of UEs from the particular network slice; and wherein determining that the number of UEs needs to be deregistered from the particular network slice comprises determining that the number of UEs needs to be deregistered from the particular network slice due to:

a number of registered UEs for the particular network slice exceeding a defined maximum number of registered UEs for the particular network slice;

a number of registered UEs for the particular network slice exceeding a defined maximum number of registered UEs for the particular network slice due to an increase in the number of registered UEs for the network slice due to service continuity; or a number of registered UEs for the particular network slice exceeding a defined maximum number of registered UEs for the particular network slice due to a decrease in the defined maximum number of UEs for the network slice to a value that is less than the number of registered UEs for the network slice.

14. A method performed by a network node for a communications system, the method comprising:

receiving, from a Network Slice Admission Control Function, NSACF, a request to deregister one or more User Equipments, UEs, from a particular network slice; and deregistering one or more UEs from the particular network slice in response to receiving the request, wherein the request comprises a request to deregister a number of UEs from the particular network slice, and deregistering one or more UEs from the particular network slice in response to receiving the request comprises deregistering the number of UEs from the particular network slice in response to receiving the request;

wherein deregistering the number of UEs from the particular network slice in response to receiving the request comprises:

selecting one or more UEs to be deregistered from the particular network slice in accordance with the request, wherein the number of UEs selected corresponds to the number of UEs requested to be deregistered from the particular network slice; and deregistering the selected one or more UEs from the particular network slice; and wherein the selected one or more UEs comprise one or more UEs for which the particular network slice is an allowed network slice that do not have any Protocol Data Unit, PDU, session established for the particular network slice.

15. The method of claim 14 wherein the request is comprises a request to deregister a particular UE from the particular network slice, and deregistering one or more UEs from the particular network slice in response to receiving the request comprises deregistering the particular UE from the particular network slice in response to receiving the request.

16. A network node for a communications system, the network node comprising processing circuitry configured to cause the network node to:

receive, from a Network Slice Admission Control Function, NSACF, a request to deregister one or more User Equipments, UEs, from a particular network slice; and deregister one or more UEs from the particular network slice in response to receiving the request, wherein the request comprises a request to deregister a number of UEs from the particular network slice, and deregistering one or more UEs from the particular network slice in response to receiving the request comprises deregistering the number of UEs from the particular network slice in response to receiving the request;

wherein deregistering the number of UEs from the particular network slice in response to receiving the request comprises:

selecting one or more UEs to be deregistered from the particular network slice in accordance with the request, wherein the number of UEs selected corresponds to the number of UEs requested to be deregistered from the particular network slice; and deregistering the selected one or more UEs from the particular network slice; and wherein the selected one or more UEs comprise one or more UEs for which the particular network slice is an allowed network slice that do not have any Protocol Data Unit, PDU, session established for the particular network slice.

* * * * *